United States Patent
Hamamura et al.

(10) Patent No.: US 10,502,164 B2
(45) Date of Patent: Dec. 10, 2019

(54) SADDLE-RIDE TYPE VEHICLE

(71) Applicant: SUZUKI MOTOR CORPORATION, Hamamatsu-Shi, Shizuoka (JP)

(72) Inventors: Masahiro Hamamura, Hamamatsu (JP); Keiji Hashimoto, Hamamatsu (JP); Toru Kuwahara, Hamamatsu (JP); Yutaro Kobayashi, Hamamatsu (JP); Takahiro Uchiyama, Hamamatsu (JP); Motohiro Chiku, Hamamatsu (JP); Hiroo Nakatsugawa, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 206 days.

(21) Appl. No.: 15/370,578

(22) Filed: Dec. 6, 2016

(65) Prior Publication Data

US 2017/0159617 A1    Jun. 8, 2017

(30) Foreign Application Priority Data

Dec. 8, 2015    (JP) .................. 2015-239679

(51) Int. Cl.
| | | |
|---|---|---|
| *F02M 25/08* | (2006.01) | |
| *B60K 15/035* | (2006.01) | |
| *F01P 3/18* | (2006.01) | |
| *F02B 61/02* | (2006.01) | |
| *F02M 35/04* | (2006.01) | |
| *F02M 35/16* | (2006.01) | |

(52) U.S. Cl.
CPC ... *F02M 25/0836* (2013.01); *B60K 15/03504* (2013.01); *F01P 3/18* (2013.01); *F02B 61/02* (2013.01); *F02M 35/048* (2013.01); *F02M 35/162* (2013.01); *B60K 2015/03514* (2013.01)

(58) Field of Classification Search
CPC ............ F02M 25/0836; F02M 35/048; F02M 35/162; B60K 15/03504; B60K 2015/03514; F01P 3/18; F02B 61/02
USPC .................. 123/519–521, 516, 41.43, 41.52; 137/493, 493.9, 495, 43, 583
See application file for complete search history.

(56) References Cited

U.S. PATENT DOCUMENTS

| | | | | |
|---|---|---|---|---|
| 6,182,693 B1* | 2/2001 | Stack | ................. | B01D 53/0415 123/519 |
| 6,273,070 B1* | 8/2001 | Arnal | ............... | B60K 15/03504 123/519 |
| 8,096,438 B2* | 1/2012 | Schmalz | ............ | B60K 15/0406 220/367.1 |
| 8,113,312 B2* | 2/2012 | Seki | ......................... | B62J 37/00 180/216 |
| 8,281,769 B2* | 10/2012 | Hudak | ............... | F02M 25/0872 123/516 |

(Continued)

FOREIGN PATENT DOCUMENTS

| | | |
|---|---|---|
| JP | H05-124560 A | 5/1993 |
| JP | 2006-027425 A | 2/2006 |

*Primary Examiner* — David Hamaoui
*Assistant Examiner* — John D Bailey
(74) *Attorney, Agent, or Firm* — Troutman Sanders LLP

(57) ABSTRACT

A saddle-ride type vehicle includes an engine unit as a driving power source, a fuel tank, and a canister. The fuel tank is configured to store fuel used by the engine unit. The canister is configured to trap fuel vapor generated in the fuel tank. The canister is disposed adjacent to the fuel tank.

10 Claims, 24 Drawing Sheets

(56) References Cited

U.S. PATENT DOCUMENTS

| | | | | |
|---|---|---|---|---|
| 8,439,148 B2* | 5/2013 | Shiina | B62K 5/01 | 180/312 |
| 8,448,737 B2* | 5/2013 | Hasegawa | B62J 35/00 | 180/219 |
| 8,851,523 B2* | 10/2014 | Shiina | B62K 5/01 | 180/233 |
| 8,915,234 B2* | 12/2014 | Gulke | B60K 15/0406 | 123/520 |
| 8,973,693 B2* | 3/2015 | Kinsman | B60R 21/13 | 180/89.1 |
| 9,440,504 B2* | 9/2016 | Bagnariol | B60G 7/006 | |
| 9,695,783 B2* | 7/2017 | Tsubone | F02M 25/0854 | |
| 2001/0027890 A1* | 10/2001 | Bria | B60K 3/04 | 180/291 |
| 2004/0007135 A1* | 1/2004 | Ikuma | F02M 25/08 | 96/135 |
| 2005/0173918 A1* | 8/2005 | Eguchi | B62J 35/00 | 280/834 |
| 2006/0011401 A1 | 1/2006 | Nakamura et al. | | |
| 2006/0096584 A1* | 5/2006 | Shears | F02M 25/0854 | 123/519 |
| 2006/0266338 A1* | 11/2006 | Kashima | B60K 15/03504 | 123/519 |
| 2009/0031995 A1* | 2/2009 | Tateishi | F02M 37/0082 | 123/509 |
| 2009/0239706 A1* | 9/2009 | Ishida | F16H 61/4017 | 477/40 |
| 2010/0032989 A1* | 2/2010 | Ohara | B60K 15/035 | 296/204 |
| 2010/0038098 A1* | 2/2010 | Groonwald | A62C 27/00 | 169/24 |
| 2010/0095937 A1* | 4/2010 | Hudak | F02M 25/0872 | 123/519 |
| 2010/0163328 A1* | 7/2010 | Hasegawa | B62J 35/00 | 180/225 |
| 2010/0206272 A1* | 8/2010 | Ishida | F02M 25/089 | 123/520 |
| 2010/0242925 A1* | 9/2010 | Yoshida | B62J 37/00 | 123/519 |
| 2010/0243355 A1* | 9/2010 | Hosoya | B62J 37/00 | 180/69.4 |
| 2010/0243358 A1* | 9/2010 | Suzuki | B62J 35/00 | 180/219 |
| 2011/0005609 A1* | 1/2011 | Suzuki | B60K 15/03519 | 137/202 |
| 2011/0024214 A1* | 2/2011 | Seki | B62J 35/00 | 180/69.4 |
| 2011/0100742 A1* | 5/2011 | Shibata | B62J 35/00 | 180/219 |
| 2011/0108344 A1* | 5/2011 | Bolich | B60K 15/073 | 180/69.4 |
| 2011/0108349 A1* | 5/2011 | McClendon | B60K 13/02 | 180/311 |
| 2011/0108351 A1* | 5/2011 | Gervais | B60K 17/04 | 180/337 |
| 2011/0120796 A1* | 5/2011 | Kuramochi | B62J 37/00 | 180/219 |
| 2011/0127098 A1* | 6/2011 | Tsutsui | B62K 11/04 | 180/219 |
| 2011/0175340 A1* | 7/2011 | Shiina | B62K 5/01 | 280/835 |
| 2011/0214572 A1* | 9/2011 | Hasegawa | B01D 53/02 | 96/122 |
| 2012/0145470 A1* | 6/2012 | Fujiyama | B62J 37/00 | 180/219 |
| 2012/0161417 A1* | 6/2012 | Kawai | B60T 8/3685 | 280/281.1 |
| 2012/0161418 A1* | 6/2012 | Kawai | B62K 11/04 | 280/281.1 |
| 2012/0186563 A1* | 7/2012 | Hasegawa | B01D 53/0415 | 123/519 |
| 2012/0187654 A1* | 7/2012 | Kawai | B60T 8/3685 | 280/288.4 |
| 2012/0199408 A1* | 8/2012 | Hayashi | B62J 35/00 | 180/219 |
| 2012/0247433 A1* | 10/2012 | Ozaki | B62J 37/00 | 123/519 |
| 2012/0260893 A1* | 10/2012 | Makino | F02M 25/0854 | 123/520 |
| 2013/0092267 A1* | 4/2013 | Leighton | B64D 37/10 | 137/565.01 |
| 2013/0248273 A1* | 9/2013 | Nakamura | F28D 1/00 | 180/229 |
| 2013/0249233 A1* | 9/2013 | Yokouchi | B62K 19/46 | 296/37.15 |
| 2013/0249251 A1* | 9/2013 | Nakamura | B60H 1/26 | 296/208 |
| 2013/0264795 A1* | 10/2013 | Sugiyama | B62K 25/283 | 280/281.1 |
| 2014/0062120 A1* | 3/2014 | Horiuchi | B60R 7/06 | 296/37.12 |
| 2014/0116794 A1* | 5/2014 | Kawai | B62K 11/04 | 180/68.1 |
| 2014/0262580 A1* | 9/2014 | Bagnariol | B60G 7/006 | 180/218 |
| 2016/0010599 A1* | 1/2016 | Tsubone | F02M 25/0854 | 123/520 |
| 2016/0245237 A1* | 8/2016 | Ono | B62J 35/00 | |

* cited by examiner

F I G. 5
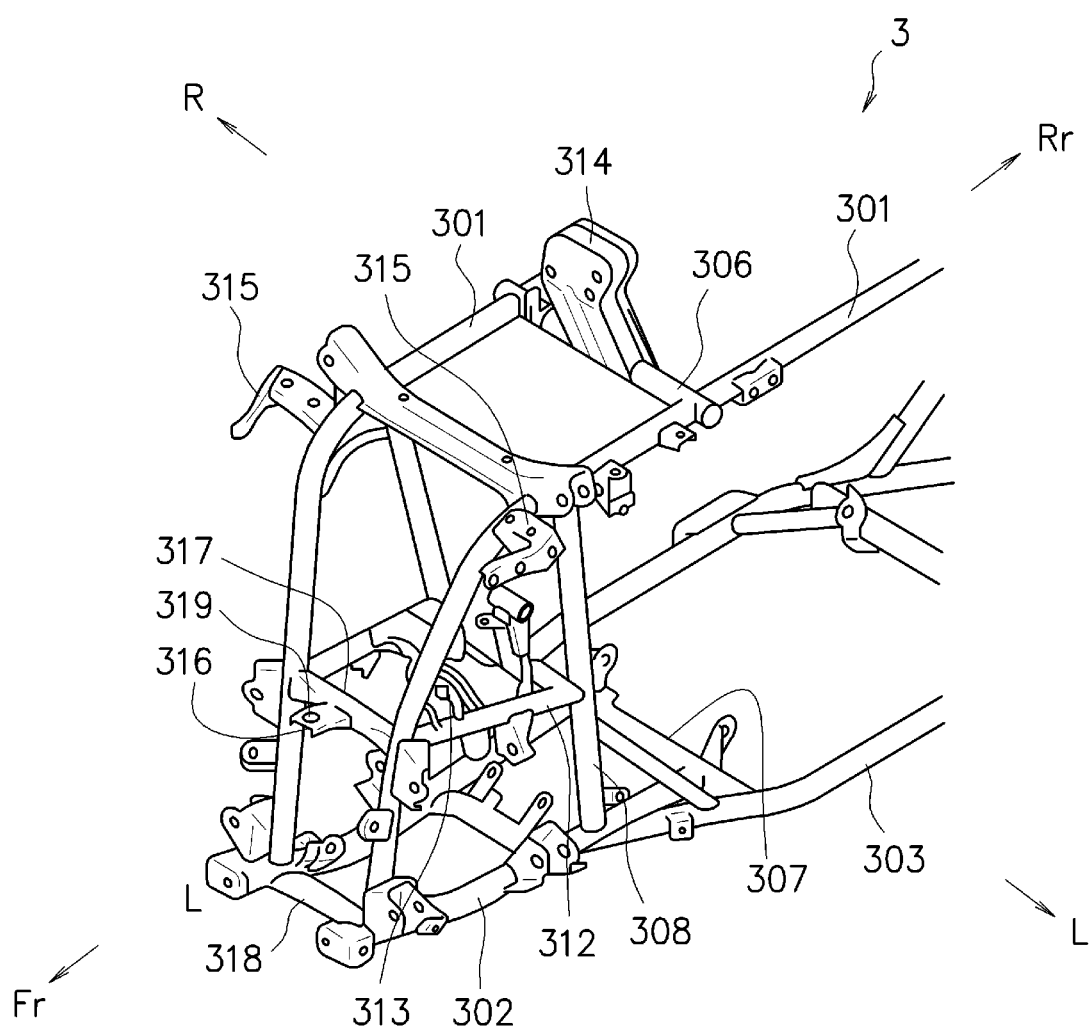

F I G. 6A
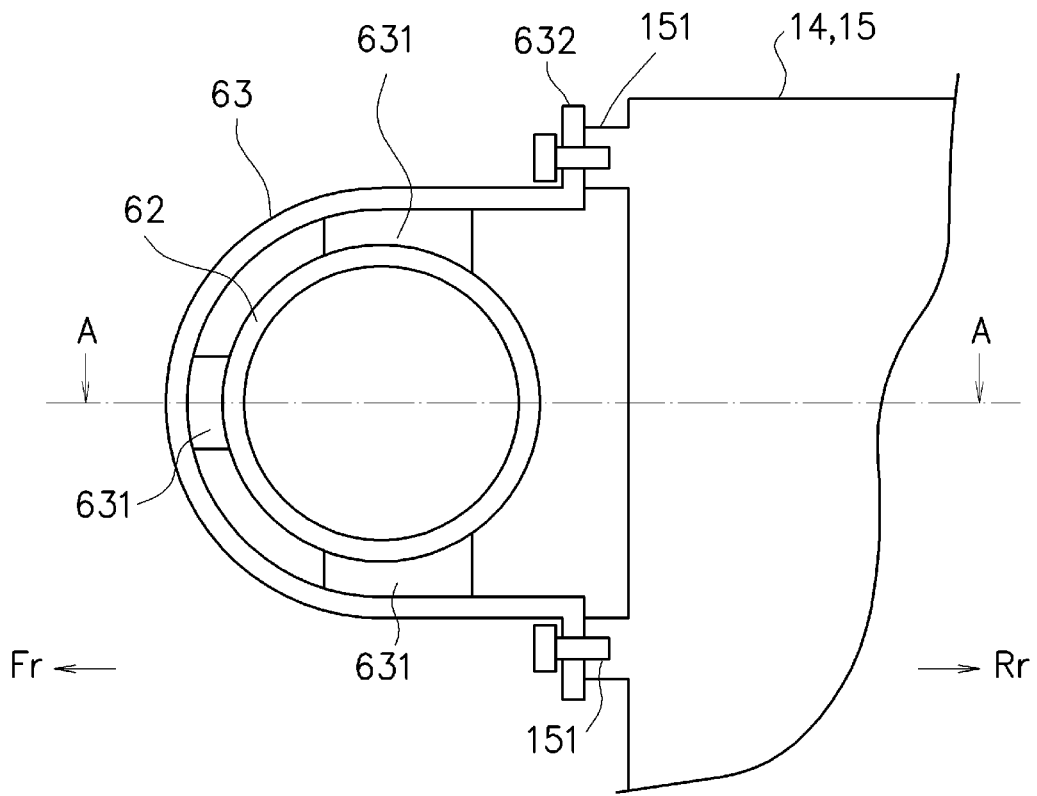
F I G. 6B
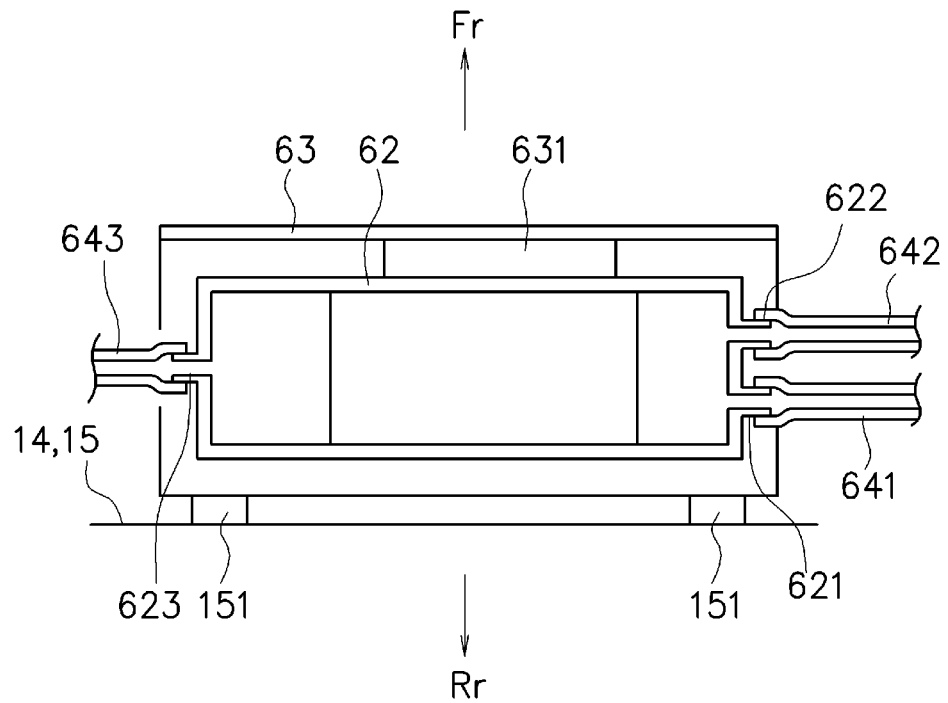

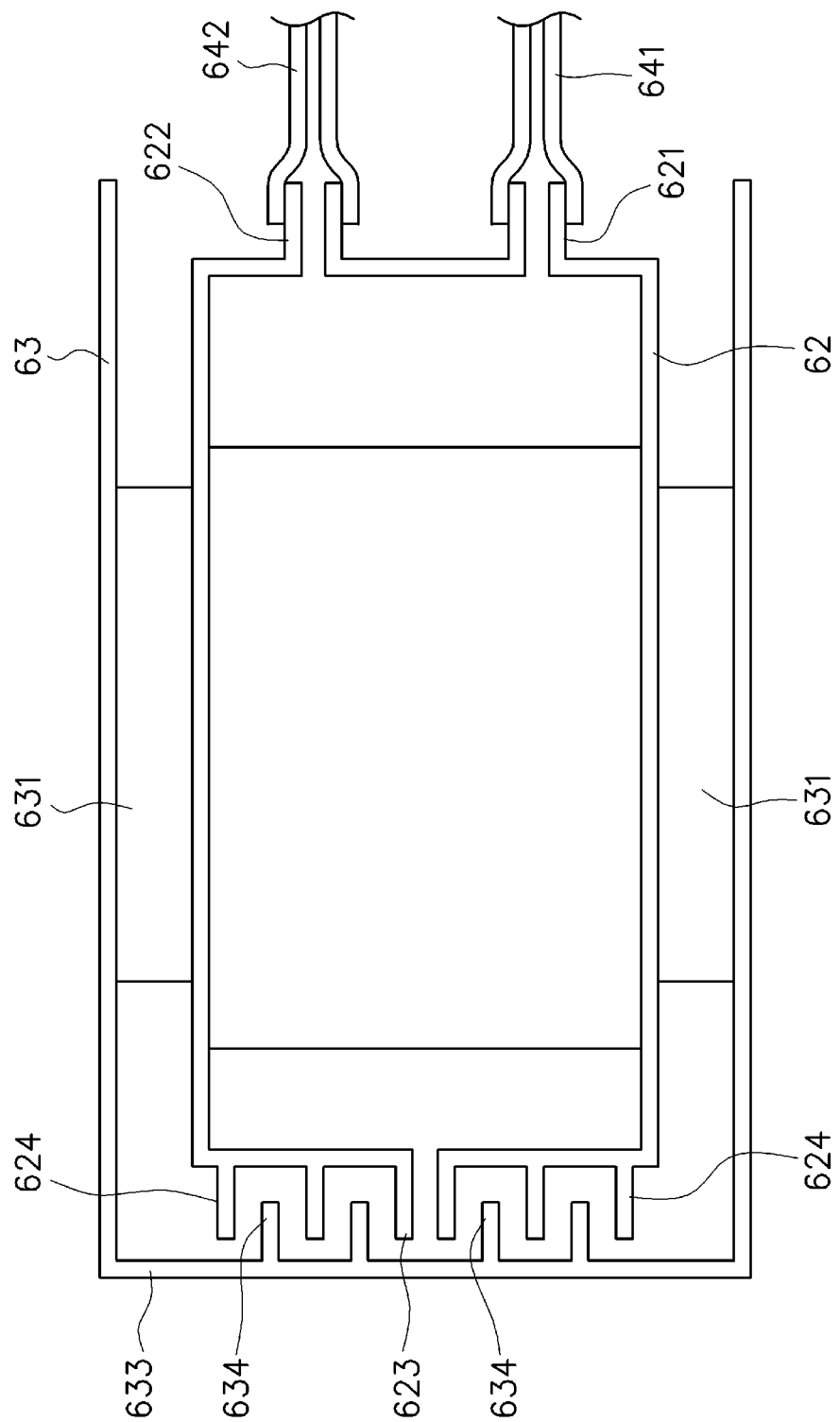

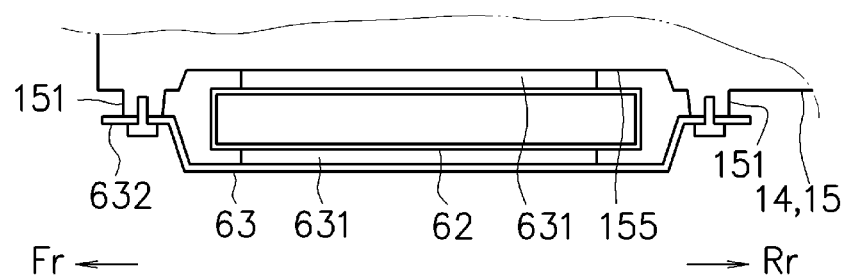
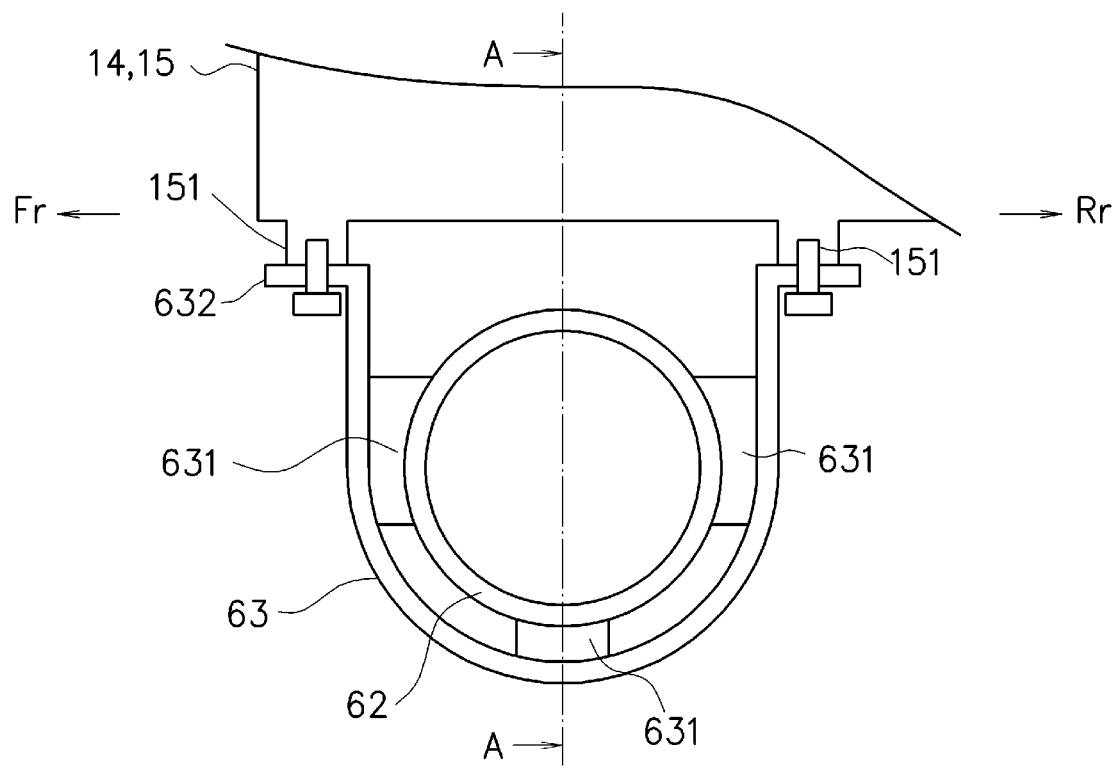

F I G. 24
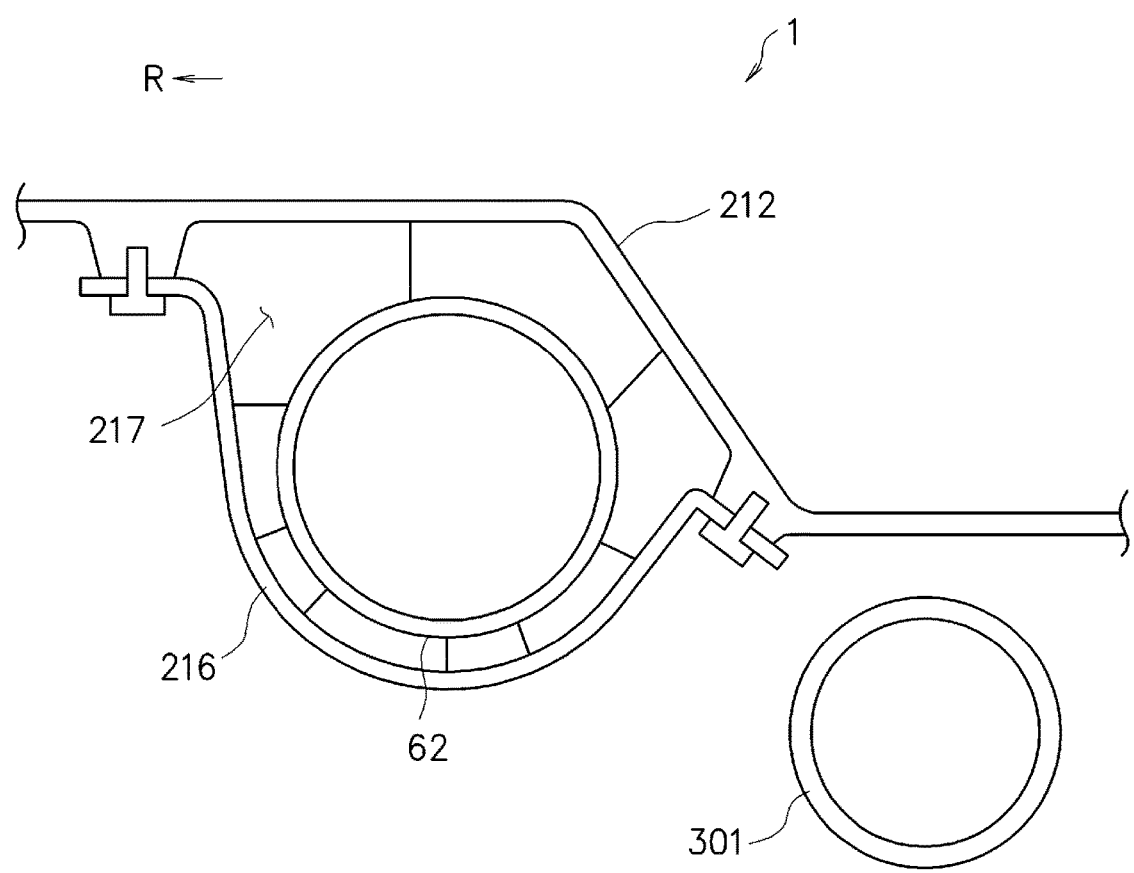

SADDLE-RIDE TYPE VEHICLE

CROSS-REFERENCE TO RELATED APPLICATIONS

This application is based upon and claims the benefit of priority of the prior Japanese Patent Application No. 2015-239679, filed on Dec. 8, 2015, the entire contents of which are incorporated herein by reference.

BACKGROUND OF THE INVENTION

Field of the Invention

The present invention relates to a saddle-ride type vehicle. Especially, the present invention relates to a saddle-ride type vehicle that includes a canister to trap fuel vapor generated in a fuel tank.

Description of the Related Art

Conventionally, a canister to trap fuel vapor generated in a fuel tank is mounted to a small-sized saddle-ride type vehicle that includes an internal combustion engine as a driving power source. For example, Patent Document 1 discloses a scooter motorcycle to which an evaporation device including a canister is mounted. A capacity of such canister is configured according to a capacity of a fuel tank. That is, as the capacity of the fuel tank increases, the capacity of the canister needs to be increased. In view of this, to a large-sized saddle-ride type vehicle as described in Patent Document 2, a large-sized (a large capacity) canister needs to be mounted according to the capacity of the fuel tank. However, compared with a four-wheeled vehicle or a similar vehicle, the saddle-ride type vehicle generally has a small space configured to mount devices, and a clearance between the mounted devices is small. In view of this, it is difficult to mount the large-sized (the large capacity) canister according to the capacity of the fuel tank to an all terrain vehicle, which is the large-sized saddle-ride type vehicle as described in Patent Document 2.

Patent Document 1: Japanese Laid-open Patent Publication No. 05-124560

Patent Document 2: Japanese Laid-open Patent Publication No. 2006-27425

SUMMARY OF THE INVENTION

In view of the above described circumstances, a problem to be solved by the present invention is to provide a saddle-ride type vehicle to which a canister can be mounted without a change in arrangements of a body frame and a device.

To solve the problems, the present invention includes an internal combustion engine as a driving power source, a fuel tank, and a canister. The fuel tank is configured to store fuel for the internal combustion engine. The canister is configured to trap fuel vapor generated in the fuel tank. The canister is disposed adjacent to the fuel tank.

The following configuration is applicable. The canister is mounted to any one of a front side, an upper side, a lower side, and a lateral side of the fuel tank.

The following configuration is applicable. The fuel tank forms a concave portion on an exterior thereof. A part of the canister enters into the concave portion.

The following configuration is applicable. The present invention further includes a canister holder that holds the canister. The canister is mounted to the fuel tank via the canister holder.

The following configuration is applicable. The canister includes a pressure regulating port. The pressure regulating port communicates between an inside and an outside of the canister. A labyrinth structure is disposed between an outer peripheral surface of the canister and an inner peripheral surface of the canister holder.

The following configuration is applicable. The present invention further includes an air cleaner configured to purify air for burning for the internal combustion engine. One end of a flow passage that communicates between an inside and an outside of the canister is coupled to the canister. An other end of the flow passage is disposed inside the air cleaner.

The following configuration is applicable. The present invention further includes a transmission, an intake duct, and an exhaust duct. The intake duct is coupled to the transmission. The intake duct is configured to take in air to cool the transmission. The exhaust duct is coupled to the transmission. The exhaust duct is configured to discharge the air that has cooled the transmission. One end of a flow passage that communicates between an inside and an outside of the canister is coupled to the canister. An other end of the flow passage is disposed near any one of an intake port disposed at the intake duct or an exhaust port disposed at the exhaust duct.

The following configuration is applicable. The saddle-ride type vehicle is a saddle-ride type all terrain vehicle.

The present invention includes a water-cooled internal combustion engine as a driving power source, a radiator, a fuel tank, a canister, and a body frame. The radiator is used for the internal combustion engine. The fuel tank is configured to store fuel for the internal combustion engine. The canister is configured to trap fuel vapor generated in the fuel tank. The internal combustion engine, the radiator, the fuel tank, and the canister are mounted to the body frame. The radiator is mounted to a front portion of the body frame. The canister is disposed at a lateral side of a radiator fan. The radiator fan is disposed at a rear of the radiator.

The following configuration is applicable. The present invention further includes a canister holder that covers a lateral side of the canister. The canister is mounted to the body frame via the canister holder.

The following configuration is applicable. The canister includes a pressure regulating port. The pressure regulating port communicates between an inside and an outside of the canister. A labyrinth structure is disposed between an outer peripheral surface of the canister and an inner peripheral surface of the canister holder.

The following configuration is applicable. The present invention further includes an air cleaner configured to purify air for burning for the internal combustion engine. One end of a flow passage that communicates between an inside and an outside of the canister is coupled to the canister. An other end of the flow passage is disposed inside the air cleaner.

The following configuration is applicable. The present invention further includes a transmission, an intake duct, and an exhaust duct. The intake duct is coupled to the transmission. The intake duct is configured to take in air to cool the transmission. The exhaust duct is coupled to the transmission. The exhaust duct is configured to discharge the air that has cooled the transmission. One end of a flow passage that communicates between an inside and an outside of the canister is coupled to the canister. An other end of the flow passage is disposed near any one of an intake port disposed at the intake duct or an exhaust port disposed at the exhaust duct.

The following configuration is applicable. The saddle-ride type vehicle is a saddle-ride type all terrain vehicle.

The present invention includes a water-cooled internal combustion engine as a driving power source, a radiator, a fuel tank, a canister, and a body frame. The radiator is used for the internal combustion engine. The fuel tank is configured to store fuel for the internal combustion engine. The canister is configured to trap fuel vapor generated in the fuel tank. The internal combustion engine, the radiator, the fuel tank, and the canister are mounted to the body frame. The radiator is mounted to a front portion of the body frame. In front view, the canister is disposed below the radiator and approximately center in a vehicle width direction.

The following configuration is applicable. The present invention further includes a canister holder that covers a front side of the canister. The canister is mounted to the body frame via the canister holder.

The following configuration is applicable. The present invention further includes an air cleaner configured to purify air for burning for the internal combustion engine. One end of a flow passage that communicates between an inside and an outside of the canister is coupled to the canister. An other end of the flow passage is disposed inside the air cleaner.

The following configuration is applicable. The present invention further includes a transmission, an intake duct, and an exhaust duct. The intake duct is coupled to the transmission. The intake duct is configured to take in air to cool the transmission. The exhaust duct is coupled to the transmission. The exhaust duct is configured to discharge the air that has cooled the transmission. One end of a flow passage that communicates between an inside and an outside of the canister is coupled to the canister. An other end of the flow passage is disposed near any one of an intake port disposed at the intake duct or an exhaust port disposed at the exhaust duct.

The following configuration is applicable. The canister includes a pressure regulating port. The pressure regulating port communicates between an inside and an outside of the canister. A labyrinth structure is disposed between an outer peripheral surface of the canister and an inner peripheral surface of the canister holder.

The following configuration is applicable. The saddle-ride type vehicle is a saddle-ride type all terrain vehicle.

The present invention includes an internal combustion engine as a driving power source, a fuel tank, a canister, and a housing. The fuel tank is configured to store fuel for the internal combustion engine. The canister is configured to trap fuel vapor generated in the fuel tank. The housing is configured to house an article. The canister is disposed inside the housing.

The following configuration is applicable. The present invention further includes an air cleaner configured to purify air for burning for the internal combustion engine. One end of a flow passage that communicates between an inside and an outside of the canister is coupled to the canister. An other end of the flow passage is disposed inside the air cleaner.

The following configuration is applicable. The present invention further includes a transmission, an intake duct, and an exhaust duct. The intake duct is coupled to the transmission. The intake duct is configured to take in air to cool the transmission. The exhaust duct is coupled to the transmission. The exhaust duct is configured to discharge the air that has cooled the transmission. One end of a flow passage that communicates between an inside and an outside of the canister is coupled to the canister. An other end of the flow passage is disposed near any one of an intake port disposed at the intake duct or an exhaust port disposed at the exhaust duct.

The following configuration is applicable. The saddle-ride type vehicle is a saddle-ride type all terrain vehicle.

The present invention includes an internal combustion engine as a driving power source, a fuel tank, a canister, and an exterior member. The fuel tank is configured to store fuel for the internal combustion engine. The canister is configured to trap fuel vapor generated in the fuel tank. The exterior member is disposed outside the saddle-ride type vehicle. The canister is disposed at the exterior member.

The following configuration is applicable. The present invention further includes an air cleaner configured to purify air for burning for the internal combustion engine. One end of a flow passage that communicates between an inside and an outside of the canister is coupled to the canister. An other end of the flow passage is disposed inside the air cleaner.

The following configuration is applicable. The present invention further includes a transmission, an intake duct, and an exhaust duct. The intake duct is coupled to the transmission. The intake duct is configured to take in air to cool the transmission. The exhaust duct is coupled to the transmission. The exhaust duct is configured to discharge the air that has cooled the transmission. One end of a flow passage that communicates between an inside and an outside of the canister is coupled to the canister. An other end of the flow passage is disposed near any one of an intake port disposed at the intake duct or an exhaust port disposed at the exhaust duct.

The following configuration is applicable. The saddle-ride type vehicle is a saddle-ride type all terrain vehicle.

BRIEF DESCRIPTION OF THE DRAWINGS

FIG. 5 is a perspective view schematically illustrating a configuration of a front portion of the body frame;

FIG. 6A is a diagram schematically illustrating configurations of a canister and a canister holder and is a cross-sectional schematic view that cuts off the canister along a surface perpendicular to a longitudinal direction of the canister;

FIG. 6B is a cross-sectional view taken along the line A-A in FIG. 6A;

FIG. 8 is a diagram schematically illustrating an example of a configuration where a pressure regulating pipe is not coupled to a pressure regulating port of the canister;

FIG. 10A is a cross-sectional view schematically illustrating a mounting structure of the canister of the saddle-ride type vehicle according to a third embodiment of the present invention;

FIG. 10B is a cross-sectional view schematically illustrating the mounting structure of the canister of the saddle-ride type vehicle according to the third embodiment of the present invention;

FIG. 24 is a cross-sectional view schematically illustrating the mounting structure of the canister.

DETAILED DESCRIPTION OF THE PREFERRED EMBODIMENTS

The following describes respective embodiments of the present invention in detail with reference to the drawings. The respective embodiments of the present invention describe a four-wheeled all terrain vehicle (ATV) that includes a water-cooled engine (internal combustion engine), a driving power source, as a saddle-ride type vehicle as an example. The respective drawings indicate a front side of the saddle-ride type vehicle by an arrow Fr, a rear side of the vehicle by an arrow Rr, a right side of the vehicle by an arrow R, and a left side of the vehicle by an arrow L as necessary.

(1) First Embodiment

<Overall Configuration of Saddle-Ride Type Vehicle>

Figure 1:
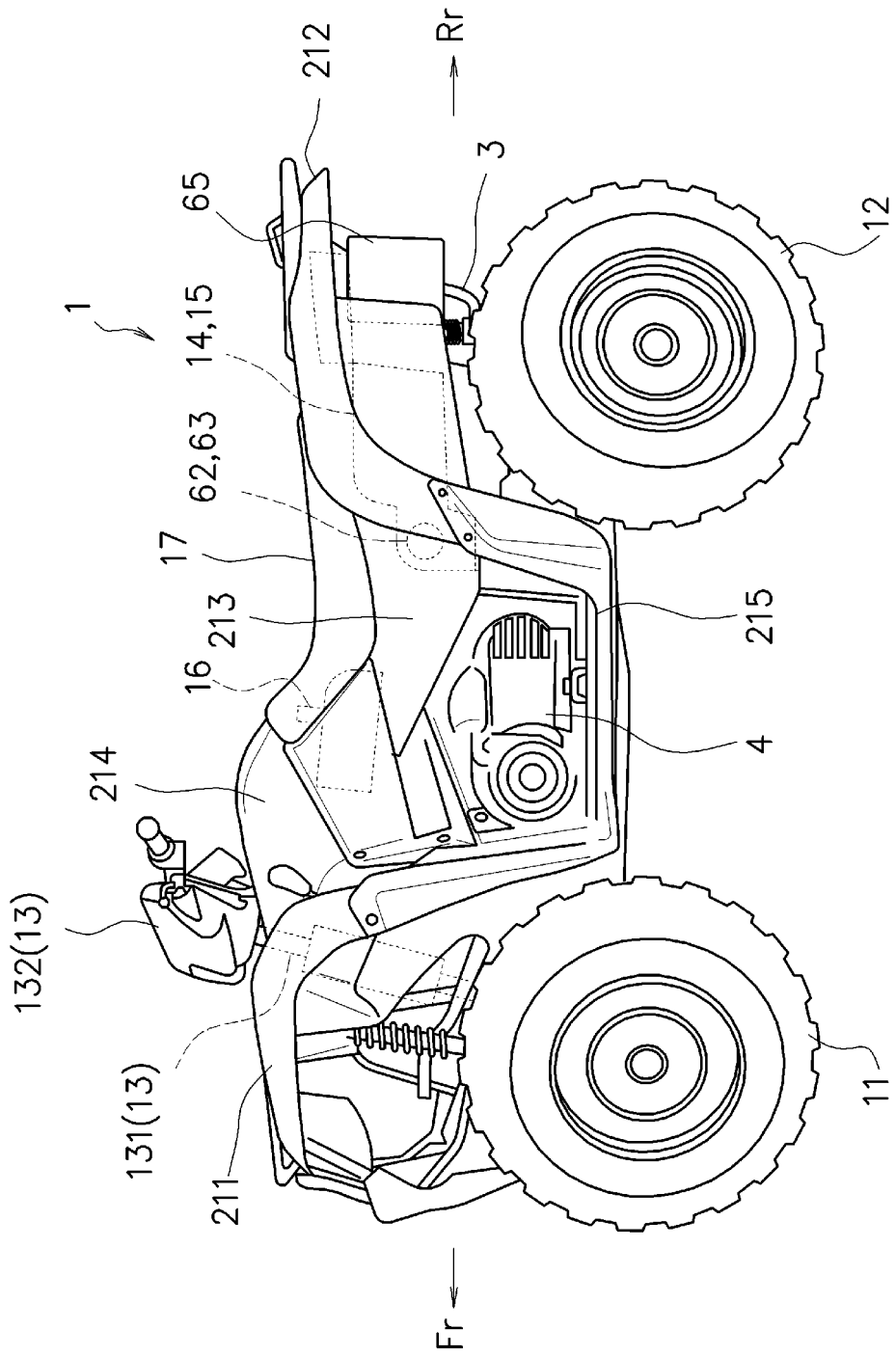
FIG. 1 is a left side view schematically illustrating an example of a configuration of a saddle-ride type vehicle according to a first embodiment of the present invention.

First, the following describes an example of the overall configuration of a saddle-ride type vehicle 1 according to the first embodiment of the present invention with reference to FIG. 1. FIG. 1 is a left side view schematically illustrating the example of the configuration of the saddle-ride type vehicle 1 according to the first embodiment of the present invention.

The saddle-ride type vehicle 1 according to the embodiment includes a body frame 3, a basic frame of a vehicle body. A right and left pair of front wheels 11 are rotatably suspended to a front portion of the body frame 3. A right and left pair of rear wheels 12 are rotatably suspended to a rear portion of the body frame 3. A steering mechanism 13 to steer the right and left pair of front wheels 11 are disposed at the front portion of the body frame 3. The steering mechanism 13 includes a steering shaft 131, a handlebar 132, and an arm group (not illustrated). The steering shaft 131 is rotatably supported to the body frame 3. The handlebar 132 is disposed on an upper portion of this steering shaft 131. The arm group transmits a rotation of the steering shaft 131 to the right and left pair of front wheels 11. A water-cooled engine unit 4 as a driving power source (internal combustion engine) is mounted to an intermediate portion of the body frame 3 in a front-rear direction and between the right and left pair of front wheels 11 and the right and left pair of rear wheels 12 in side view. A fuel tank 14 to store fuel supplied to the engine unit 4 is disposed at a rear portion of the body frame 3 and a rear of the engine unit 4. The fuel tank 14 is covered with a tank cover 15 as an exterior. An air cleaner 16 is mounted to a position on an upper portion of the body frame 3, at a rear of the steering shaft 131, and above the engine unit 4. The air cleaner 16 takes in air for burning from outside and purifies the air. A saddle-ride type seat 17 is disposed on the upper side of the body frame 3. An occupant is seated on the seat 17. The seat 17 is positioned on the rear side of the air cleaner 16 and above the fuel tank 14. A radiator 61 to cool cooling water for the engine unit 4 is mounted to the front portion of the body frame 3. A radiator fan 613 is disposed at the rear of the radiator 61.

As exterior members, the saddle-ride type vehicle 1 includes a front fender 211, a rear fender 212, side covers 213, and a front cover 214. The front fender 211 covers the respective upper sides of the right and left pair of front wheels 11. The rear fender 212 covers the respective upper sides of the right and left pair of rear wheels 12. The side covers 213 are disposed at both right and left lower sides of the seat 17. The front cover 214 is disposed at the front of the seat 17. The front cover 214 covers the upper portion of the engine unit 4 and the air cleaner 16. The side covers 213 cover the rear portion of the engine unit 4 and the fuel tank 14. The side covers 213 and the rear fender 212 are integrally formed. Step boards 215 are disposed on the front lower side of the seat 17 and outside of both the right and left of the engine unit 4. The occupant places his/her feet on the step boards 215. These front fender 211, rear fender 212, front cover 214, side covers 213, and step boards 215 are formed by, for example, injection molding of a resin material. These members are removably secured to the body frame 3 with bolts or similar members. Conventionally-known various configurations are applicable as configurations of the front fender 211, the front cover 214, the side covers 213, and the step board 215, and the configurations are not specifically limited. A known configuration is applicable to the rear fender 212 as well excluding a configuration to house a canister, which will be described later.

Besides, an Engine Control Module (ECM) (not illustrated) is mounted to the body frame 3. A computer that includes a CPU, a ROM, and a RAM is applied as the ECM. The ECM receives signals from various sensors disposed in the saddle-ride type vehicle 1. According to the received signals, the ECM controls respective units in the saddle-ride type vehicle 1 including the engine unit 4. For example, the ECM displays an amount of remaining fuel on a meter unit disposed at the handlebar 132, displays a speed, controls an amount of fuel injection according to an operation of a throttle lever disposed at the handlebar 132, and controls an ignition of a spark plug. Although a position to which the ECM is mounted is not specifically limited, for example, the ECM is mounted to the lower side of the seat 17.

(Configuration of Body Frame)

Figure 2:
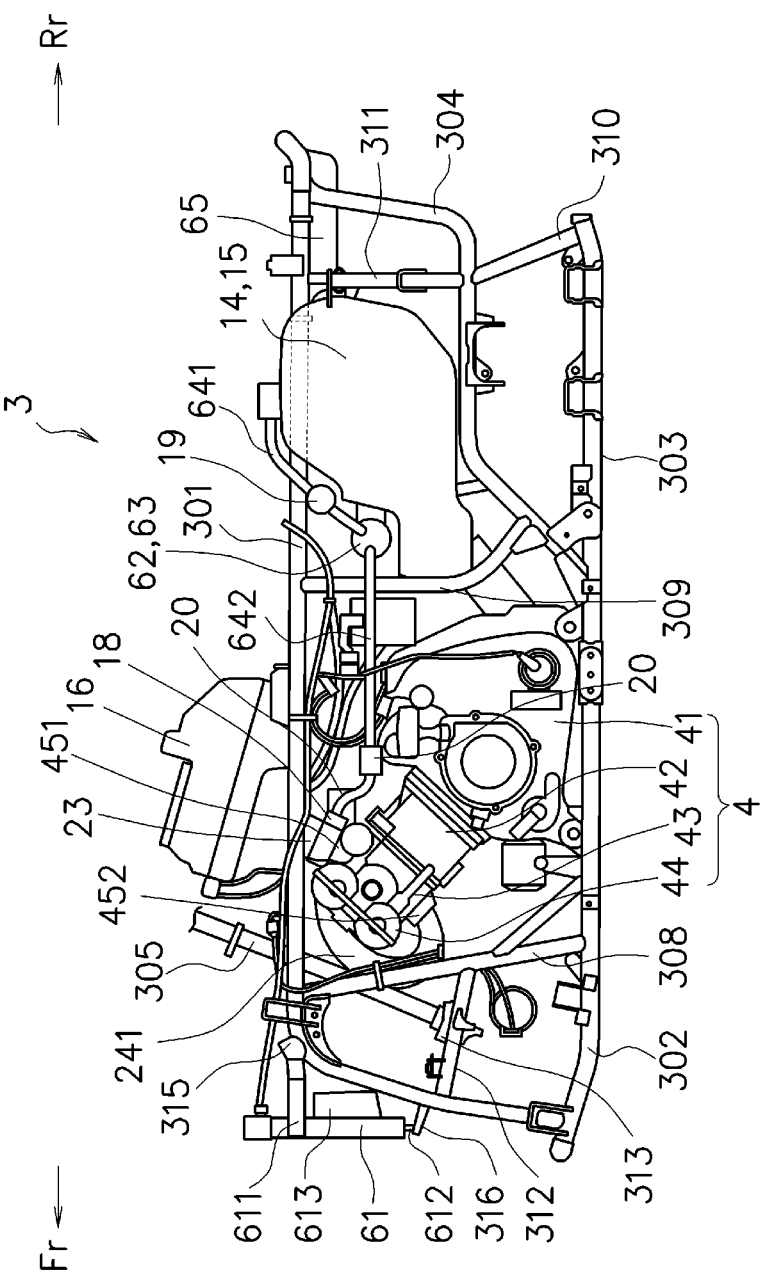
FIG. 2 is a left side view schematically illustrating a configuration of a body frame and configurations and arrangements of devices mounted to the body frame.
Figure 3:
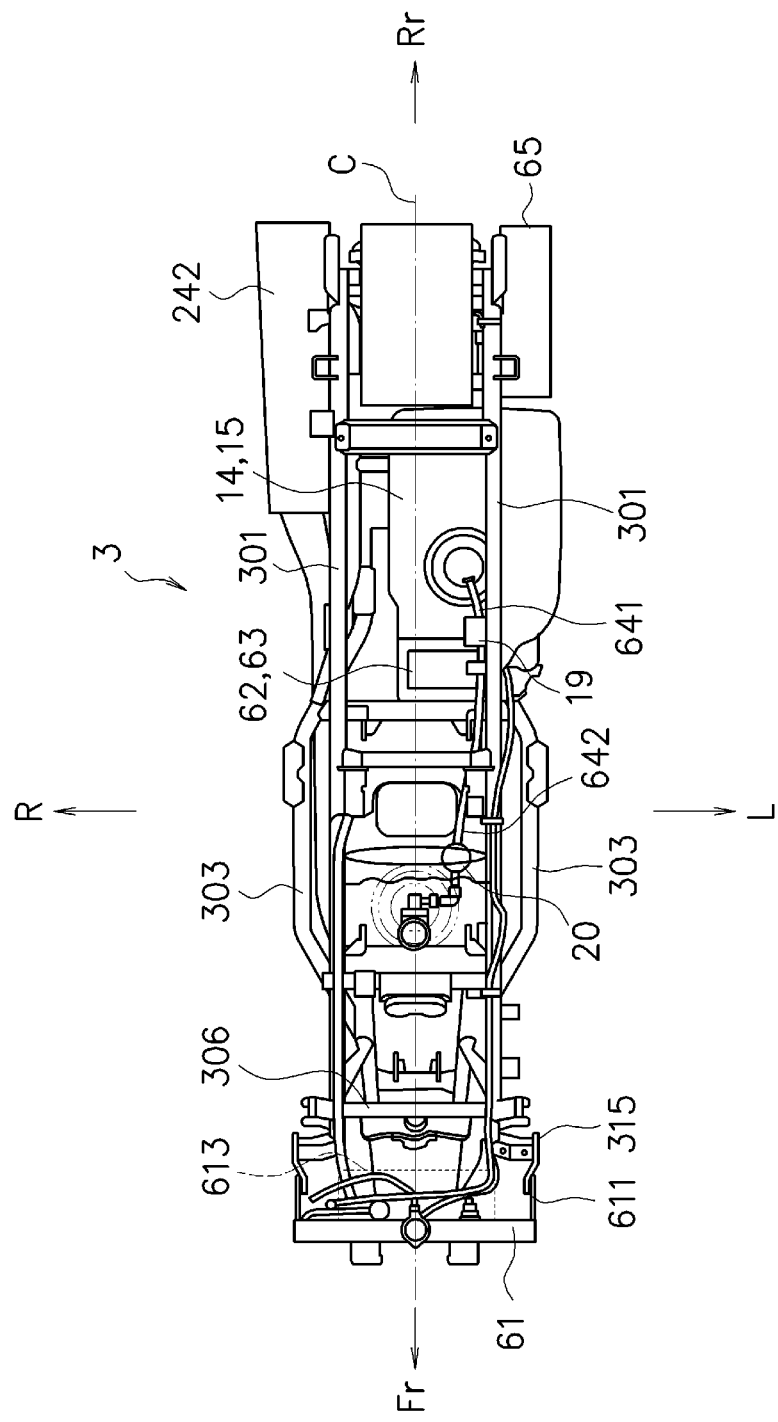
FIG. 3 is a top view schematically illustrating the configuration of the body frame and the configurations and arrangements of the devices mounted to the body frame.
Figure 4:
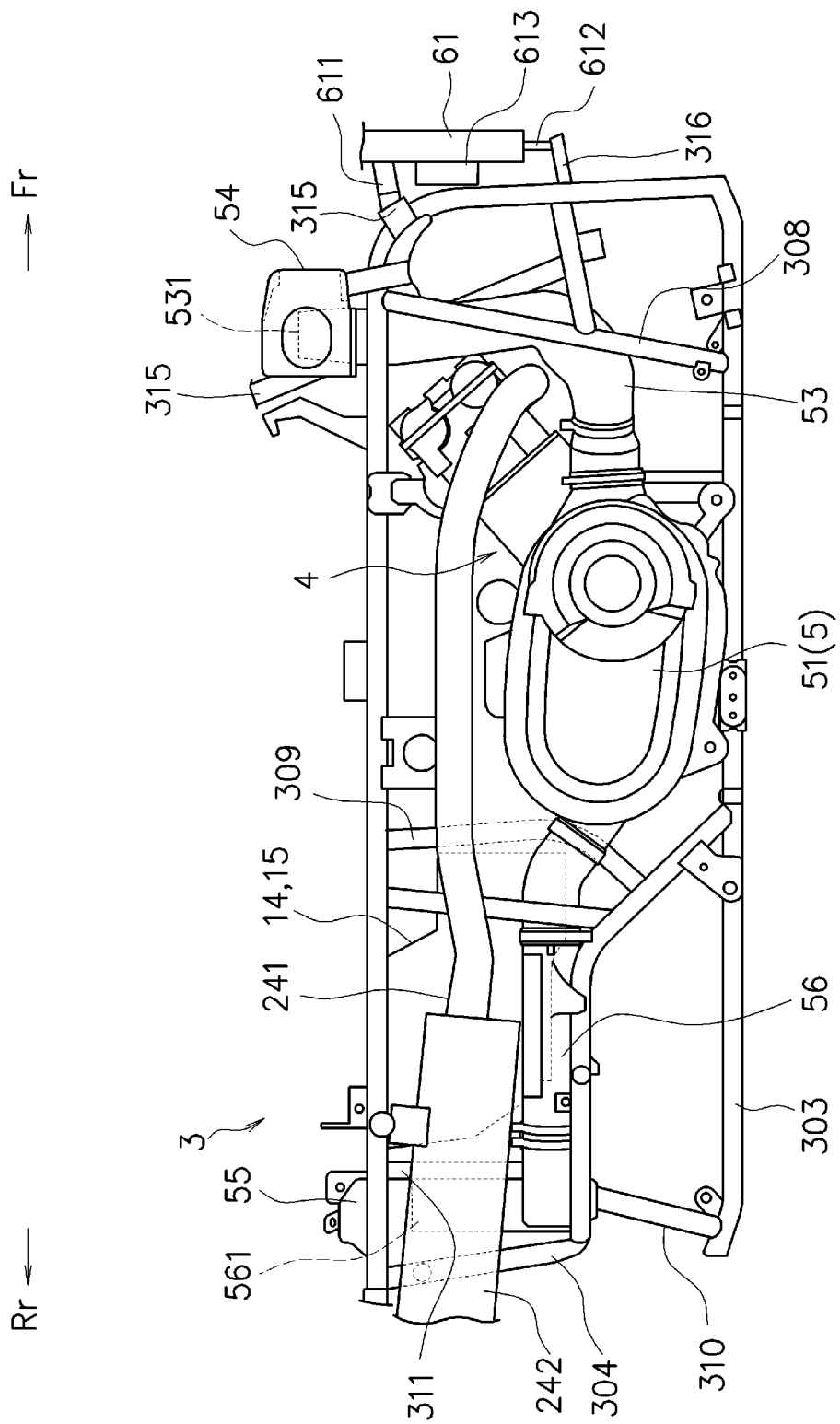
FIG. 4 is a right side view schematically illustrating the configuration of the body frame and the configurations and arrangements of devices mounted to the body frame.

The following describes the configuration of the body frame 3 with reference to FIG. 2 to FIG. 5. FIG. 2 to FIG. 4 are drawings schematically illustrating the configuration of the body frame 3 and configurations and arrangements of devices mounted to the body frame 3. FIG. 2 is a left side view, FIG. 3 is a top view, and FIG. 4 is a right side view. FIG. 5 is a perspective view schematically illustrating a configuration of a front portion of the body frame 3.

The body frame 3 includes a right and left pair of upper pipes 301, a right and left pair of front lower pipes 302, a right and left pair of rear lower pipes 303, a right and left pair of intermediate pipes 304, and a steering head pipe 305. The entire body frame 3 is configured to be approximately symmetrical with respect to a vehicle body centerline C.

The right and left pair of upper pipes 301 are disposed on the upper portion of the body frame 3 separated providing some extent of distance in a right-left direction (a vehicle width direction). Excluding portions near front end portions thereof, the entire right and left pair of upper pipes 301 have a rod shape horizontally extending in the front-rear direction and are approximately parallel to one another. The portions near the front end portions of the right and left pair of upper pipes 301 extend in an approximately up-down direction so as to have a posture inclining rearward in side view. A mutual interval between the portions near the front end portions of the right and left pair of upper pipes 301 (parts extending in the up-down direction) gradually decreases as approaching to the front side (the lower side). The front ends (the lower ends) of the right and left pair of upper pipes 301 are bonded to front end portions of the front lower pipes 302 or portions in the proximity. The right and left pair of upper pipes 301 are bonded to an upper cross member 306 extending approximately horizontal in the vehicle width direction.

The right and left pair of front lower pipes 302 are disposed on the front lower portion of the body frame 3. As illustrated in FIG. 5, the right and left pair of front lower pipes 302 are away in the vehicle width direction and an interval between the right and left pair of front lower pipes 302 gradually narrows down as approaching to the front side. Rear ends of the right and left pair of front lower pipes 302 are bonded to a lower cross member 307. The lower cross member 307 extends between the right and left pair of rear lower pipes 303 horizontally in the vehicle width direction. In other words, the right and left pair of front lower pipes 302 extend from the lower cross member 307 to the front side. The right and left pair of front lower pipes 302 curve or bend at the intermediate portion in the front-rear direction in side view. The front portions of the right and left pair of front lower pipes 302 are inclined upwardly toward the front in side view and the rear portions extend horizontally in the front-rear direction in side view. The respective front ends (the lower ends) of the right and left pair of upper pipes 301 are bonded to the parts of the right and left pair of front lower pipes 302 inclining upwardly toward the front.

The right and left pair of rear lower pipes 303 are disposed at the lower portion of the body frame 3 providing a certain distance in the vehicle width direction. Excluding parts near the rear end portions, the right and left pair of rear lower pipes 303 extend approximately horizontal in side view. The rear end portions are inclined upwardly toward the rear. As illustrated in FIG. 3, the front portions of the right and left pair of rear lower pipes 303 bulge outside in the vehicle width direction. In top view, the right and left pair of rear lower pipes 303 are positioned outside in the vehicle width direction with respect to the right and left pair of upper pipes 301. Specifically, the right and left pair of rear lower pipes 303 each have parts inclining rearward and outside in the vehicle width direction, parts extending in the front-rear direction approximately parallel to one another, parts inclining rearward and a center side in the vehicle width direction, and parts extending in the front-rear direction approximately parallel to one another in an order from the front side. The front ends of the right and left pair of rear lower pipes 303 are bonded to the respective right and left pair of front lower pipes 302 at the outside in the vehicle width direction. In other words, the right and left pair of rear lower pipes 303 branch from the right and left pair of front lower pipes 302 inclining rearward and outside in the vehicle width direction. The right and left pair of rear lower pipes 303 are bonded by the lower cross member 307, which extends approximately horizontal in the vehicle width direction.

The right and left pair of intermediate pipes 304 are disposed between the respective right and left pair of upper pipes 301 and right and left pair of rear lower pipes 303 at the rear portion of the body frame 3. As illustrated in FIG. 2 to FIG. 4, the respective front ends (lower ends) of the right and left pair of intermediate pipes 304 are bonded to the right and left pair of rear lower pipes 303 near the respective centers in the front-rear direction. Specifically, as illustrated in FIG. 3, the right and left pair of intermediate pipes 304 are bonded to parts inclined to the center side in the vehicle width direction. On the other hand, respective rear ends (upper ends) of the right and left pair of intermediate pipes 304 are bonded to the right and left pair of upper pipes 301 near the respective rear end portions. The respective front portions of the right and left pair of intermediate pipes 304 are inclined upwardly toward the rear, the intermediate portions in the front-rear direction extend approximately horizontal to the front-rear direction, and the rear end portions extend in the approximately up-down direction so as to incline rearward.

Furthermore, the body frame 3 includes front vertical pipes 308, middle vertical pipes 309, rear lower vertical pipes 310, and rear upper vertical pipes 311. The front vertical pipes 308 are disposed at the front portion of the body frame 3 so as to stand in a forward-inclined posture. Upper ends of the front vertical pipes 308 are bonded to parts of front ends or the proximity of the front ends of the right and left pair of upper pipes 301 where the right and left pair of upper pipes 301 horizontally extend in the front-rear direction. Lower ends of the front vertical pipes 308 are bonded to the right and left pair of front lower pipes 302 close to parts from where the respective rear lower pipes 303 branch. The middle vertical pipes 309 are disposed at positions close to the center of the body frame 3 in the front-rear direction. The lower ends of the middle vertical pipe 309 are bonded to the front portions (parts inclined upwardly toward the rear) of the right and left pair of intermediate pipes 304. The upper ends of the middle vertical pipes 309 are bonded to the respective right and left pair of upper pipes 301. The middle vertical pipe 309 curves or bends at the intermediate portion in the up-down direction, the upper portion extends approximately vertical, and the lower portion extends to be inclined downwardly toward the rear.

The rear lower vertical pipes 310 are disposed so as to stand in the forward-inclined posture at a rear lower portion of the body frame 3. Upper ends of the rear lower vertical pipes 310 are bonded to positions close to the rear (rear end portions of horizontally extending parts or parts close to the rear end portions) of the respective right and left pair of intermediate pipes 304. Lower ends of the rear lower vertical pipes 310 are bonded to respective rear end portions or near the rear end portions (parts inclined upwardly toward the rear) of the right and left pair of rear lower pipes 303. The rear upper vertical pipes 311 extend to be approximately vertical at the rear portion of the body frame 3. Upper ends of the rear upper vertical pipes 311 are bonded to parts near the rear end portions of the right and left pair of upper pipes 301. Lower ends of the rear upper vertical pipe 311 are bonded to positions on the right and left pair of intermediate pipes 304 close to the rear (the rear end portions of horizontally extending parts in the front-rear direction or parts close to the rear end portions). As especially illustrated in FIG. 2 and FIG. 4, the lower ends of the rear upper vertical pipes 311 and the upper ends of the rear lower vertical pipes 310 may be bonded to identical positions on the respective right and left pair of intermediate pipes 304 in the front-rear direction.

The steering head pipe 305 is disposed at a position approximately center in the vehicle width direction at the front portion of the body frame 3. The steering head pipe 305 has a tubular structure inclining rearward. A bonding structure of the steering head pipe 305 is as follows. A right and left pair of support pipes 312 are disposed so as to stride between the front portions of the right and left pair of upper pipes 301 (parts standing in a rearward-inclined posture) and the front vertical pipes 308. The support pipes 312 extend approximately horizontal or downwardly toward the rear. A lower head pipe bracket 313 strides between the right and left pair of support pipes 312. The upper cross member 306 is disposed to bond the right and left pair of upper pipes 301 together. An upper head pipe bracket 314 is disposed on this upper cross member 306. A lower end of the steering head pipe 305 is bonded to the lower head pipe bracket 313. An intermediate portion of the steering head pipe 305 in the up-down direction is bonded to the upper head pipe bracket 314.

<Configurations and Arrangements of Devices Mounted to Body Frame>

The following describes the configurations and the arrangements of the devices mounted to the body frame 3. As illustrated in FIG. 2 to FIG. 5, to the body frame 3, the engine unit 4, the fuel tank 14, the air cleaner 16, the radiator 61, and a canister 62 are mounted. A transmission 5 is integrally disposed with the engine unit 4. An intake duct 53 and an exhaust duct 56, which are coupled to the transmission 5, are supported to the body frame 3.

(Engine Unit)

As illustrated in FIG. 2 to FIG. 4, the engine unit 4, the internal combustion engine as the driving power source, is disposed in a space surrounded by the right and left pair of upper pipes 301 and the right and left pair of rear lower pipes 303. Especially as illustrated in FIG. 4, the engine unit 4 is disposed on an upper side of a part of the right and left pair of rear lower pipes 303 bulging outside in the vehicle width direction. Therefore, as illustrated in FIG. 2 and FIG. 4, in side view, the engine unit 4 is positioned in the space surrounded by the right and left pair of upper pipes 301, she right and left pair of rear lower pipes 303, the front vertical pipes 308, and the middle vertical pipes 309. The engine unit 4 is secured to a bracket or a similar member disposed at the body frame 3 with a bolt or a similar member.

For example, one-cylinder water-cooled engine (the internal combustion engine) is applied to the engine unit 4. As a casing, the engine unit 4 includes a crankcase assembly 41, a cylinder block 42, a cylinder head 43, and a cylinder head cover 44. The crankcase assembly 41 internally houses a rotatable crankshaft. The cylinder block 42 is disposed obliquely upward in front of the crankcase assembly 41. The cylinder head 43 is disposed obliquely upward in front of the cylinder block 42. Further, the cylinder head cover 44 is disposed obliquely upward in front of the cylinder head 43. The cylinder block 42 internally includes a combustion chamber. The combustion chamber internally includes a reciprocatable piston. As illustrated in FIG. 2, the cylinder block 42 is disposed such that an axis of the combustion chamber (a piston reciprocating direction), which is formed inside the cylinder block 42, inclines forward. The cylinder head 43 includes an intake port 451 and an exhaust port 452. The intake port 451 takes air-fuel mixture constituted of air for burning and fuel into the combustion chamber. The exhaust port 452 discharges exhaust gas from the combustion chamber. The intake port 451 is disposed on a rear upper side of the cylinder head 43. The exhaust port 452 is disposed on a front lower side of the cylinder head 43.

The intake port 451 and the air cleaner 16, which will be described later, are coupled with an intake pipe 23. A throttle body 18 is disposed at the intake pipe 23. The throttle body 18 includes a throttle valve and an injector. The throttle valve adjusts a degree of opening of a path for air for burning. The injector injects the fuel from the fuel tank 14 to the air for burning to mix the fuel with the air. The air-fuel mixture constituted of the air for burning and the fuel flows in the intake port 451 in the engine unit 4. An ECM controls the degree of opening of the throttle valve and an amount of fuel injection and timing of the injection by the injector.

(Fuel Tank)

The fuel tank 14 is disposed at the rear of the engine unit 4. Specifically, in side view, the fuel tank 14 is positioned in a space surrounded by the engine unit 4, the right and left pair of intermediate pipes 304, the right and left pair of upper pipes 301, and the right and left pair of rear upper vertical pipes 311. The fuel tank 14 is disposed above the intermediate pipe 304 and is positioned on the rear upper side of the engine unit 4. As illustrated in FIG. 3, the fuel tank 14 is not disposed at a symmetrical position with respect to the vehicle body centerline C but at a position biased to one of the right and the left. This embodiment describes the configuration where the fuel tank 14 is disposed at a position biased to the left in the vehicle width direction from the vehicle body centerline C. Specifically, as illustrated in FIG. 3, in top view, a right side surface of the fuel tank 14 is positioned between the right and left pair of upper pipes 301. On the other hand, in top view, a part of the fuel tank 14 close to the left is positioned outside in the vehicle width direction with respect to the upper pipe 301 on the left. In top view, the fuel tank 14 is formed into a tapered shape to the distal end, and a dimension in the vehicle width direction decreases as approaching to the front. Especially, the left side surface (the part bulging outside in the vehicle width direction with respect to the upper pipe 301) inclines to the front-rear direction of the vehicle body. The right side surface (the surface on the side positioned between the right and left pair of upper pipes 301) may be parallel to the vehicle body centerline C. Accordingly, for example, the fuel tank 14 is formed into an approximately pentagonal shape where one of tour corners in plan view is chamfered.

A side corresponding to the chamfered part is disposed to be positioned on the left front side.

(Air Cleaner)

In side view, the air cleaner 16 is disposed above the engine unit 4 and between the steering head pipe 305 and the seat 17. As illustrated in FIG. 2 and FIG. 3, in side view, the most part of the air cleaner 16 is positioned upward with respect to the upper pipes 301. An intake port (not illustrated) to take in external air is disposed at the upper portion of the air cleaner 16. The air cleaner 16 internally includes a filter element to purify the flown-in air. A feeding port is disposed at the lower portion of the air cleaner 16. The feeding port serves as an outlet for the purified air to flow to the intake port 451 in the engine unit 4. The feeding port of the air cleaner 16 and the intake port 451 in the engine unit 4 are coupled together with the intake pipe 23 to make the air passable. Furthermore, the throttle body 18 to adjust an amount the air for burning is disposed between the feeding port of the air cleaner 16 and the intake port 451 in the engine unit 4. The throttle body 18 includes the injector, which injects the fuel to the air for burning flown from the air cleaner 16 (the purified air) to mix the fuel with the air. The air cleaner 16 is secured to the right and left pair of upper pipes 301 and the upper cross member 306 on the body frame 3 with a bolt or a similar member.

(Radiator)

The radiator 61, which cools the cooling water for the water-cooled engine unit 4, is disposed on the front portion of the body frame 3. As illustrated in FIG. 2 to FIG. 5, upper radiator brackets 315 are disposed on the front upper portions (parts curved to the lower side) of the right and left pair of upper pipes 301. The upper radiator brackets 315 extend from the respective right and left pair of upper pipes 301 outside in the vehicle width direction and further extend from the distal ends to the front. In view of this, the upper radiator bracket 315 has an approximately "L" shape in top view. Bolt holes are formed on parts extending to the front. As illustrated in FIG. 5, a bridge pipe 317 is disposed at a part near the center in a height direction of the upper pipes 301 at the front portions of the upper pipes 301 (parts inclining rearward) to couple the right and left pair of upper pipes 301. A tongue-shaped lower radiator bracket 316, which projects from this bridge pipe 317 to the front, is disposed. The lower radiator bracket 316 includes a through-hole 319 passing through in the up-down direction. On the other hand, a body of the radiator 61 is formed into an approximately quadrangle in front view. In front view, tongue-shaped mounting brackets 611, which extend rearward, are disposed at upper end portions on both right and left side surfaces or near the side surfaces. In front view, a mounting boss 612, which project downward, is disposed at a lower surface of the body of the radiator 61. The mounting boss 612, which is disposed at the lower surface of the radiator 61, is inserted into the through-hole 319 on the lower radiator bracket 316 from upward. The right and left mounting brackets 611, which are disposed on both the right and left side surfaces of the radiator 61, are secured to the respective upper radiator brackets 315 with bolts or similar members. In this manner, the radiator 61 is mounted and supported to the front upper side of the body frame 3.

(Exhaust System)

As illustrated in FIG. 4, the exhaust system is mounted to the body frame 3. The exhaust system includes an exhaust pipe 241 and a muffler 242. One end of the exhaust pipe 241 is coupled to the exhaust port 452 in the engine unit 4. The exhaust pipe 241 extends from the exhaust port 452 in the engine unit 4 to the front and then curves into an approximately "U" shape at the front side of the cylinder head 43 to the rear. Then, the exhaust pipe 241 passes through the right side of the cylinder head 43 and the right side of the fuel tank 14 and reaches the rear portion close to the right of the body frame 3. The muffler 242 is coupled to the other one end (the rear end) of the exhaust pipe 241. This configuration allows the exhaust gas discharged from the combustion chamber through the exhaust port 452 to be discharged to the air through the exhaust pipe 241 and the muffler 242. The exhaust pipe 241 and muffler 242 are secured to the body frame 3 with bolts or similar members. For example, a plate-shaped bracket is disposed at the upper pipe 301 on the right. The exhaust pipe 241 and the muffler 242 are secured to this plate-shaped bracket with the bolts or similar members.

(Transmission)

The belt type transmission 5 is disposed integrally with the crankcase assembly 41 at the right side of the crankcase assembly 41 in the engine unit 4. A rotational power from the engine unit 4 is transmitted to the rear wheels 12 via the transmission 5 and a propeller shaft (not illustrated). The following briefly describes an exemplary configuration of the belt type transmission 5. The belt type transmission 5 includes a belt case 51 as a casing. The belt case 51 internally houses rotatable drive pulley and driven pulley arranged in the front-rear direction. The drive pulley is housed close to the front of the belt case 51 and is coupled with a crankshaft in the engine unit 4 via a centrifugal clutch such that the power can be intermittent with the crankshaft. The driven pulley is housed close to the rear of the belt case 51 and is coupled so as to ensure a transmission of the rotational power to a propeller shaft mechanism (not illustrated). A belt (a V belt) to transmit the rotational power is wound around the drive pulley and the driven pulley.

To the belt case 51, the intake duct 53 and the exhaust duct 56 are coupled. The intake duct 53 takes in air to cool the belt. The exhaust duct 56 discharges the air used for cooling. In view of this, the air for cooling the belt taken in from an intake port 531 on the intake duct 53 passes through the intake duct 53 and flows into the belt case 51. The air that has cooled the belt passes through the exhaust duct 56 and is discharged outside.

The intake duct 53 is formed into an approximately "L" shape in side view. That is, the intake duct 53 has a part extending forward from the front end portion of the belt case 51 and a part extending upward from a distal end of this part. The intake port 531 is formed on the upper end of the part extending upward. An intake port guard 54 to protect this intake port 531 is also disposed on the upper end. The intake port guard 54 has a box shape that internally forms a space. The upper end portion of the intake duct 53 is inserted from the inner lower side of the intake port guard 54. An intake port (not illustrated) to take in the external air is formed on the front upper portion of the intake port guard 54. A drain to discharge entered water or similar liquid to outside is formed at the front lower portion of the intake port guard 54.

The exhaust duct 56 is coupled to the rear end portion of the belt case 51. The exhaust duct 56 includes a part extending approximately horizontal from the rear end of the belt case 51 to the rear and a part extending approximately vertical from the rear end of the part extending approximately horizontal to upward. In view of this, the exhaust duct 56 has an approximately "L" shape in side view. At an upper end of the part extending in the vertical direction, an exhaust port 561 to discharge the air is formed and an exhaust port guide 55 to protect this exhaust port 561 is disposed. The exhaust port guide 55 has a box shape that internally forms a space. The upper end portion of the exhaust duct 56 is inserted to the inside of the exhaust port guide 55 from the lower side. As illustrated in FIG. 4, in side view, the part of the exhaust duct 56 extending in the horizontal direction is disposed on the upper side of the parts of the intermediate pipes 304 horizontally extending in the front-rear direction. In side view, the part of the exhaust duct 56 extending in the vertical direction is disposed between the rear portions (the parts extending in the up-down direction) of the intermediate pipes 304 and the fuel tank 14.

In top view, the intake duct 53, the exhaust duct 56, the intake port guard 54, and the exhaust port guide 55 are disposed at positions biased to the right from the center in the vehicle width direction and the center side in the vehicle width direction with respect to the upper pipe 301 on the right in top view. Specifically, in top view, the intake port guard 54 and the exhaust port guide 55 are disposed adjacent to the upper pipe 301 on the right. In side view, at least a part of the respective intake port guard 54 and exhaust port guide 55 are positioned above the upper pipe 301 on the right. FIG. 4 illustrates the configuration where the entire intake port guard 54 is positioned above the upper pipe 301 on the right and a part of the exhaust port guide 55 is positioned on the upper side of the upper pipe 301 on the right; however, the configuration is not limited to this. The intake port guard 54 and the exhaust port guide 55 are each secured to the upper pipe 301 on the right with bolts or similar members.
(Canister)

The saddle-ride type vehicle 1 according to this embodiment includes the canister 62 to trap fuel vapor generated inside the fuel tank 14. In the case where the canister 62 is disposed in the saddle-ride type vehicle 1 such as the All terrain vehicle, the following problem occurs. That is, compared with a four-wheeled vehicle or a similar vehicle, the saddle-ride type vehicle 1 has a small space to dispose the devices, reducing a clearance between the devices. This makes it difficult to secure an additional space to dispose the canister 62. To secure the space to dispose the canister 62, a structure of the body frame 3 needs to be changed. Doing so requires a change in design of the body frame 3 and fails to share components, resulting in an increase in production cost or a similar cost. The canister 62 needs to communicate between the inside and the outside to adjust the pressure. In the case where the saddle-ride type vehicle 1 is the all terrain vehicle, compared with a vehicle travelling paved roads, the saddle-ride type vehicle 1 is likely to be covered with dirt, water, and a similar matter. Therefore, measures to prevent a foreign matter such as the dirt and water from entering the canister 62 needs to be taken. Therefore, this embodiment provides a configuration that can dispose the canister 62 without changing the configuration of the body frame 3. A configuration that can prevent the foreign matter such as the dirt and water from entering the canister 62 is provided.

The following describes the configurations of the canister 62 and a canister holder 63 with reference to FIG. 6A and FIG. 6B. FIG. 6A and FIG. 6B are diagrams schematically illustrating the configurations of the canister 62 and the canister holder 63. FIG. 6A is a cross-sectional schematic view that cuts off the canister 62 along a surface perpendicular to a longitudinal direction of the canister 62. FIG. 6B is a cross-sectional view taken along the line A-A in FIG. 6A. The canister 62 has a tubular shape that internally forms a space (a cavity). FIG. 6A and FIG. 6B illustrate an example of the canister 62 formed into a cylindrical shape; however, the cross-sectional shape of she canister 62 is not limited to the circular shape. The inside of the canister 62 is filled with activated carbon to absorb and trap the fuel vapor generated inside the fuel tank 14. The canister 62 includes three ports, a tank port 621, a purge port 622, and a pressure regulating port 623. These ports are parts to communicate between the inside and the outside of the canister 62. The tank port 621 and the purge port 622 are disposed at one end surface in the longitudinal direction, and the pressure regulating port 623 is disposed on the end surface opposite from the end surface for the tank port 621 and the purge port 622.

The tank port 621 is coupled to the fuel tank 14 with a gas discharge pipe 641, a flow passage for the fuel vapor. In view of this, the fuel vapor generated inside the fuel tank 14 flows into the canister 62 through the gas discharge pipe 641 and the tank port 621. The activated carbon, which is filled inside the canister 62, absorbs and traps the flown-in fuel vapor. A rollover valve or a breather valve 19 is disposed at the middle of the gas discharge pipe 641. An inclination of the saddle-ride type vehicle 1 equal to or more than a specified inclination closes the rollover valve. This prevents liquid fuel inside the fuel tank 14 from flowing in the canister 62 when the saddle-ride type vehicle 1 falls down or a similar situation. The breather valve 19 opens and closes the flow passage between the canister 62 and the fuel tank 14 (that is, the gas discharge pipe) in accordance with the control by the ECM.

The purge port 622 is coupled to the throttle body 18 with a purge pipe 642, a flow passage for the fuel vapor. The fuel absorbed to the activated carbon in the canister 62 flows in the throttle body 18 through the purge port 622 and the purge pipe 642. For example, during acceleration of the saddle-ride type vehicle 1 or a similar situation, since a downstream side of the throttle body 18 becomes a negative pressure, the fuel absorbed to the activated carbon separates from the activated carbon and is suctioned to the throttle body 18 through the purge port 622 and the purge pipe 642. The suctioned fuel vapor is mixed with the air for burning, which is flown from the air cleaner 16, in the throttle body 18. This temporarily increases an air-fuel ratio of the air-fuel mixture, increasing the acceleration of the saddle-ride type vehicle 1. In this manner, the fuel trapped to the canister 62 is supplied to the engine unit 4 for burning. A canister purge valve 20 is disposed at the flow passage for fuel vapor from the purge port 622 of the canister 62 to the throttle body 18. For example, as illustrated in FIG. 2, the canister purge valve 20 is mounted to the rear side of the throttle body 18. The purge pipe 642 is, for example, piped along any one of the right and left pair of upper pipes 301.

The pressure regulating port 623 is a part to communicate between the inside and the outside of the canister 62. The inside of the canister 62 is communicated with the outside through the pressure regulating port 623, thus maintaining the pressure at atmospheric pressure (or a pressure close to the atmospheric pressure). One end of a pressure regulating pipe 643 is coupled to the pressure regulating port 623. The pressure regulating port 623 adjusts the pressure through this pressure regulating pipe 643. The other end (an open side end) of the pressure regulating pipe 643 is disposed at any one of the inside of the air cleaner 16, near the intake port 531 of the intake duct 53, and near the exhaust port 561 of the exhaust duct 56. In the case where the fuel vapor is generated inside the fuel tank 14 and the pressure increases, the fuel vapor flows from the fuel tank 14 to the inside of the canister 62 through the gas discharge pipe 641 and the tank port 621. In this respect, the air inside the canister 62 is discharged through the pressure regulating port 623 and the pressure regulating pipe 643. On the other hand, in the case where the throttle body 18 becomes the negative pressure during the acceleration of the saddle-ride type vehicle 1 or a similar situation, the fuel absorbed to the activated carbon separates from the activated carbon and is suctioned to the throttle body 18 through the purge port 622 and the purge pipe 642. Then, the external air flows into the canister 62 through the pressure regulating pipe 643 and the pressure regulating port 623.

The canister holder 63 has a function that covers an outer peripheral surface of the canister 62 to protect the canister 62 and a function that holds the canister 62 to a predetermined member of the saddle-ride type vehicle 1. For example, the canister holder 63 is formed into a tubular shape or an approximately "U" shape and an approximately "Ω" shape in cross section. The canister holder 63 is, for example, formed of a metal plate and formed by presswork or is made of a resin material and formed by injection molding. A supporting member 631 to hold the canister 62 is mounted to an inner peripheral surface of the canister holder 63. An elastic body such as rubber and sponge is applicable to this supporting member 631. An insertion of the canister 62 into the inner peripheral side of the canister holder 63 holds the canister 62 to the inner peripheral side of the canister holder 63 by the supporting member 631. Besides, the canister holder 63 includes brackets for bolt stopper (hereinafter referred to as "holder brackets 632").

Figure 7A:
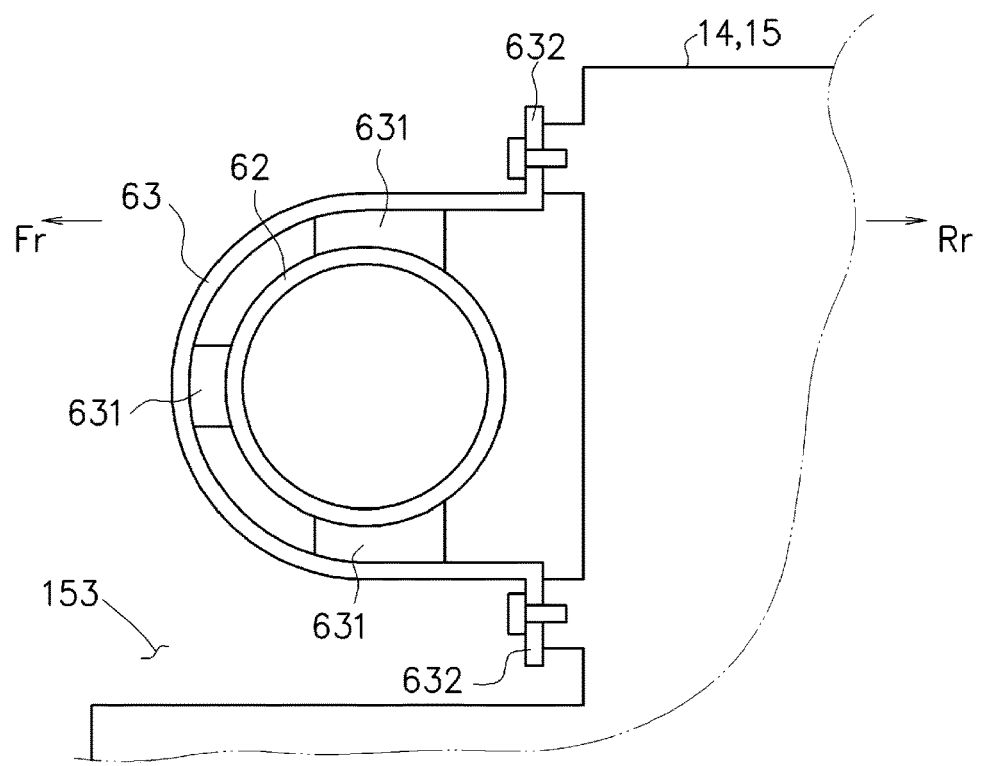
FIG. 7A is a diagram schematically illustrating a mounting structure of the canister and a left side view illustrating an extraction of a portion near a front surface of a fuel tank.
Figure 7B:
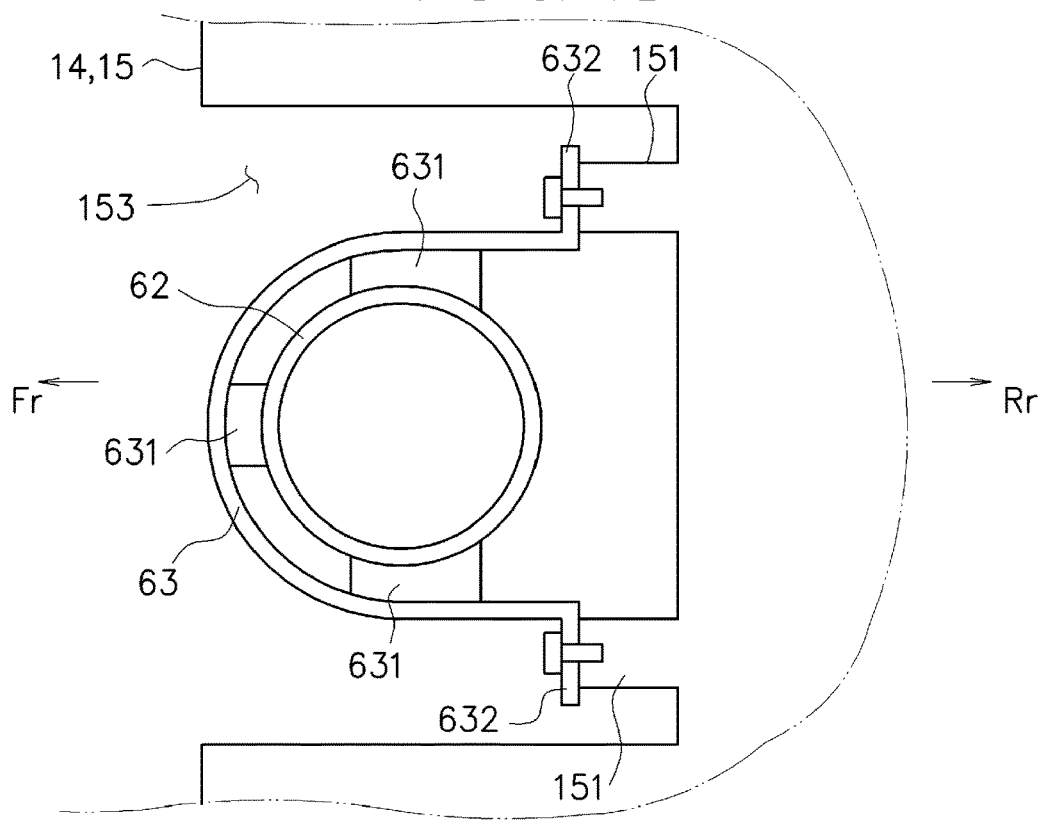
FIG. 7B is a diagram schematically illustrating the mounting structure of the canister and a left side view illustrating the extraction of the portion near the front surface of the fuel tank.

The following describes a mounting structure of the canister 62 with reference to FIG. 7A and FIG. 7B. FIG. 7A and FIG. 7B are diagrams schematically illustrating the mounting structure of the canister 62 and are left side views illustrating an extraction of a portion near the front surface of the fuel tank 14. In this embodiment, as illustrated in FIG. 7A and FIG. 7B, the canister 62 is mounted adjacent to the front surface side of the fuel tank 14. For example, the fuel tank 14 is covered with the tank cover 15, which is an exterior. The tank cover 15 is a testaceous member made of metal, resin, or a similar material. A front side concave portion 153 is formed on the front surface of the tank cover 15 (the exterior for the fuel tank 14). A part of or all the canister holder 63 housing the canister 62 is insertable into the front side concave portion 153. With the canister 62 with the tubular shape, the front side concave portion 153 extending horizontally in the vehicle width direction is formed on the front surface of the tank cover 15. FIG. 7A illustrates the configuration where the front side concave portion 153 is formed into a cutout shape and extends horizontally in the vehicle width direction along an upper side on the front surface of the tank cover 15. The front side concave portion 153 may have a configuration of extending horizontally in the vehicle width direction along a lower side on the front surface of the tank cover 15. In this case, the configuration illustrated in FIG. 7A is flipped upside down becomes this configuration. FIG. 7B illustrates a configuration of the front side concave portion 153 formed into a groove shape extending horizontally in the vehicle width direction at an intermediate portion in the up-down direction at the front surface of the tank cover 15. In this manner, it is only necessary that the front side concave portion 153 be disposed at the front surface of the tank cover 15, the exterior for the fuel tank 14, and at least a part of the canister 62 be disposed so as to enter into this front side concave portion 153. Then, a longitudinal direction of the canister may not be parallel to the horizontal surface, the longitudinal direction may be, for example, the up-down direction, or the canister may be inclined. The tank cover 15 includes tank bosses 151 (protruded constructions) that have bolt holes at this front side concave portion 153 or near this front side concave portion 153. FIG. 7A and FIG. 7B illustrate the configuration that includes the tank bosses 151 at the front surface of the tank cover 15 (more specifically, the inside of the front side concave portion 153 and the surface facing the front side). The holder brackets 632 of the canister holder 63 are fastened to these tank bosses 151 with bolts. Accordingly, the canister 62 is mounted to the front surface side of the fuel tank 14 adjacent to the fuel tank 14. Mounting the canister 62 to the fuel tank 14 via the canister holder 63 covers the front surface side of the canister 62 by the canister holder 63. In view of this, the canister 62 is protected by the canister holder 63.

The canister 62 may have a configuration of being directly mounted to the tank cover 15 (the exterior for the fuel tank 14) without via the canister holder 63. For example, a plate-shaped bracket including a bolt insertion hole may be disposed at the outer peripheral surface of the canister 62 and this bracket may be secured to the tank bosses 151 of the tank cover 15 with bolt.

One end of the pressure regulating pipe 643 is coupled to the pressure regulating port 623 of the canister 62 and is piped along any one of the right and left pair of upper pipes 301. The other end (the open side end) of the pressure regulating pipe 643 is disposed at any one of the inside of the air cleaner 16, near the intake port 531 of the intake duct 53, and near the exhaust port 561 of the exhaust duct 56. Specifically, with the configuration disposed inside the air cleaner 16, the other end is preferably disposed near the filter element and downstream of a flow of the air viewed from the filter element. With the configuration disposed near the intake duct 53, the other end is preferably disposed inside the intake port guard 54. With the configuration disposed near the exhaust duct 56, the other end is preferably disposed inside the exhaust port guide 55. This configuration restrains an intrusion of the foreign matter (dirt, dust, and water) to the pressure regulating pipe 643.

The pressure regulating pipe 643 may not be coupled to the pressure regulating port 623 of the canister 62. The following describes the example where the pressure regulating pipe 643 is not coupled to the pressure regulating port 623 of the canister 62 with reference to FIG. 8. FIG. 8 is a diagram schematically illustrating the example of a configuration where the pressure regulating pipe 643 is not coupled to the pressure regulating port 623 of the canister 62 and is a diagram corresponding to FIG. 6B. As illustrated in FIG. 8, an end surface of the canister 62 on the side of disposing the pressure regulating port 623 has concentric unevenness (hereinafter referred to as "canister side unevenness 624") so as to surround the pressure regulating port 623. The canister holder 63 includes a lid portion 633 to cover the end surface of the canister 62 at an end portion on the side corresponding to a side where the pressure regulating port 623 of the canister 62 is disposed. For example, the canister holder 63 may be formed into a tubular shape with closed bottom with open one end and closed other end. In this case, a part corresponding to the bottom of the pipe serves as the lid portion 633, which covers the end surface of the canister 62. This lid portion 633 has concentric unevenness (hereinafter referred to as "holder side unevenness 634") on the inner peripheral side similar to the end surface of the canister 62. An insertion of the canister 62 into the canister holder 63 enters the canister side unevenness 624 and the holder side unevenness 634 to one another so as to mesh with one another. This forms a labyrinth structure between the inner peripheral surface of the canister holder 63 and the outer peripheral surface of the canister 62. The inside and the outside of the canister 62 are communicated via the pressure regulating port 623 and this labyrinth structure. Thus, since the labyrinth structure is formed so as to surround the pressure regulating port 623, the intrusion of the foreign matter (for example, the dirt, dust, and water) from the outside to the inside of the canister 62 can be restrained. This configuration eliminates the need for piping the pressure regulating pipe 643.

With the first embodiment, by mounting the canister 62 to the front surface of the tank cover 15 of the fuel tank 14, the configuration to mount the canister 62 to the body frame 3 may not be disposed. Compared with the configuration without the canister 62, the configuration of the body frame 3 and the arrangements of the devices may not be changed. Accordingly, the design change for the configuration of the body frame 3 and the arrangements of the devices may not be performed, thereby ensuring sharing the components. This ensures restraining the increase in production cost. Since the canister 62 is disposed adjacent to the fuel tank 14, the distance between the canister 62 and fuel tank 14 can be reduced. This ensures shorting the length of the gas discharge pipe 641. Since the canister 62 is disposed between the engine unit 4 and fuel tank 14, a length of the purge pipe 642, which couples the canister 62 and the throttle body 18, can also be short. Disposing the open side end of the pressure regulating pipe 643 at; any one of the inside of the air cleaner 16, near the intake port 531 of the intake duct 53 (inside the intake port guard 54), and near the exhaust port 561 of the exhaust duct 56 (inside the exhaust port guide 55) ensures restraining the intrusion of the foreign matter.

(2) Second Embodiment

Figure 9:
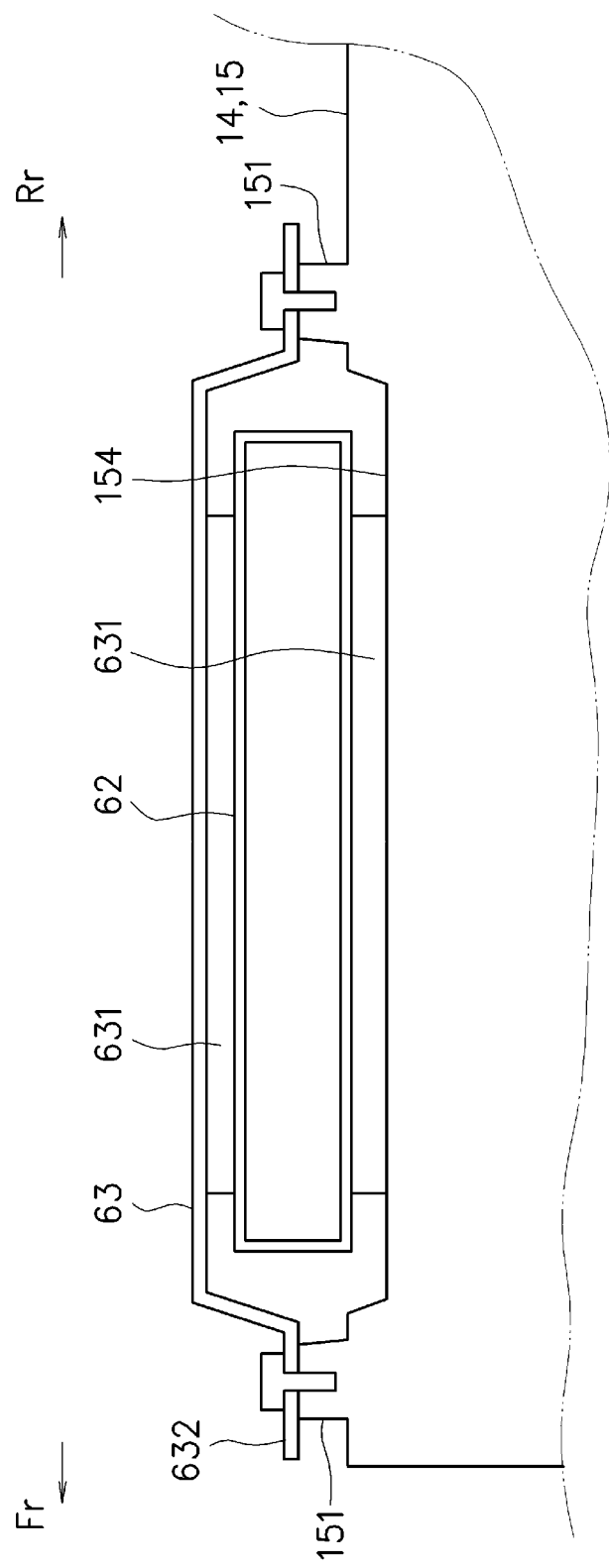
FIG. 9 is a cross-sectional view schematically illustrating a mounting structure of the canister of the saddle-ride type vehicle according to a second embodiment of the present invention.

The following describes the second embodiment of the present invention. The second embodiment has a form where the canister 62 is mounted adjacent to the upper side of the fuel tank 14. Like reference numerals designate corresponding or identical elements throughout the first embodiment and the second embodiment, and therefore such elements will not be further elaborated here. FIG. 9 is a cross-sectional view schematically illustrating the mounting structure of the canister 62 of the saddle-ride type vehicle 1 according to the second embodiment of the present invention.

As illustrated in FIG. 9, the canister 62 has the box shape. Especially, the canister 62 is preferably formed into a box shape (a "thin box shape") whose height dimension is smaller than dimensions in the front-rear direction and the right-left direction in top view. This configuration eases the arrangement of the canister 62 between the fuel tank 14 and the seat 17. The shape of the canister 62 in top view is not especially limited. For example, the canister 62 may have a rectangular parallelepiped shape with approximately quadrangle in top view. Similar to the first embodiment, the canister 62 includes the three ports, the tank port 621, the purge port 622, and the pressure regulating port 623 on the side surfaces. The tank port 621 and the purge port 622 are disposed on the identical side surface. The pressure regulating port 623 is disposed on a side surface opposite side from the side surface on which the tank port 621 and the purge port 622 are disposed.

The canister holder 63 has a box shape whose upper side is closed and whose lower side opens. In other words, the canister holder 63 has a configuration like flipping a tray (a dish) with shallow bottom upside down. The shape of the canister holder 63 in top view is determined according to the shape of the canister 62 in top view. In short, it is only necessary that the canister holder 63 can cover the upper side of the canister 62. Similar to the first embodiment, the canister holder 63 includes the supporting member 631 and the holder brackets 632. The canister 62 is disposed on the top surface of the tank cover 15, the exterior for the fuel tank 14, and the canister holder 63 is mounted from the upper side thereof. The holder brackets 632 of the canister holder 63 are secured to the tank bosses 151, which are disposed on the top surface of the tank cover 15, with bolts or similar members. Thus, the canister 62 is mounted adjacent to the upper side of the fuel tank 14 with the top surface side covered with the canister holder 63. As illustrated in FIG. 9, an upper side concave portion 154 may be formed on the top surface of the exterior for the fuel tank 14, and a part of the canister 62 may be disposed to enter this upper side concave portion 154.

A cutout or a through-hole is formed on the side surface of the canister holder 63 so as to avoid an interference with the respective gas discharge pipe 641, purge pipe 642, and pressure regulating pipe 643. With a configuration where the pressure regulating pipe 643 is not coupled to the pressure regulating port 623, the canister holder 63 includes the lid portion 633 to cover the surface of the canister 62 on the side where the pressure regulating port 623 is disposed. The concentric holder side unevenness 634 is formed on an inner peripheral surface of this lid portion 633. Similar to the first embodiment, the mutual entrance of the canister side unevenness 624, which is disposed on the canister 62, and the holder side unevenness 634, which is disposed on the lid portion 633 of the canister holder 63, forms the labyrinth structure between the outer peripheral surface of the canister 62 and the inner peripheral surface of the canister holder 63. A piping path for the pressure regulating pipe 643, the purge pipe 642, and the gas discharge pipe 641 may be identical to that of the first embodiment.

The second embodiment of the present invention can provide the effects similar to the first embodiment. Furthermore, with this embodiment, the canister 62 can be disposed in the existing space between the fuel tank 14 and the seat 17. Additionally, the canister 62 can be disposed in the space of less intrusion of water, dirt, or a similar foreign matter.

(3) Third Embodiment

The following describes the third embodiment of the present invention with reference to FIG. 10A and FIG. 10B. FIG. 10A and FIG. 10B are cross-sectional view schematically illustrating the mounting structure of the canister 62 of the saddle-ride type vehicle 1 according to the third embodiment of the present invention. FIG. 10A illustrates an example of the canister 62 with tubular shape while FIG. 10B illustrates an example of the canister 62 with thin box shape. The third embodiment has a form where the canister 62 is mounted adjacent to the lower side of the fuel tank 14. Like reference numerals designate corresponding or identical elements throughout the first embodiment and the third embodiment, and therefore such elements will not be further elaborated here.

As illustrated in FIG. 10A and FIG. 10B, the canister 62 has the tubular shape or the box shape. With the canister 62 with the tubular shape, the configuration similar to the first embodiment is applicable to the canister 62 and the canister holder 63. With the canister 62 with the box shape, the configuration similar to the second embodiment is applicable to the canister 62 and the canister holder 63.

As illustrated in FIG. 10A and FIG. 10B, the tank bosses 151 with bolt holes are disposed on the lower surface of the tank cover 15, the exterior for the fuel tank 14. With the canister 62 housed, the holder brackets 632 of the canister holder 63 are fastened to the tank bosses 151, which are disposed on the lower surface of the exterior for the fuel tank 14, with bolts. Thus, the canister 62 housed in the canister holder 63 is mounted adjacent to the lower side of the fuel tank 14. A lower side concave portion 155 concaved to the upper side may be formed on the lower surface of the tank cover 15. This lower side concave portion 155 may house a part of the canister 62. In this case, as illustrated in FIG. 10A, the canister 62 is disposed inside the lower side concave portion 155 together with the canister holder 63. Alternatively, as illustrated in FIG. 10B, the upper portion of the canister 62 enters into the lower side concave portion 155, which is disposed on the lower surface of the fuel tank 14, and the lower portion is housed in the canister holder 63.

A part of the respective pressure regulating pipe 643, purge pipe 642, and gas discharge pipe 641 are piped along any one of the right and left pair of middle vertical pipes 309. Piping paths other than that may be identical to those of the first embodiment.

The third embodiment of the present invention can provide the effects similar to the first embodiment. Furthermore, with this embodiment, the configurations and arrangements of other devices and members may not be changed.

(4) Fourth Embodiment

Figure 11:
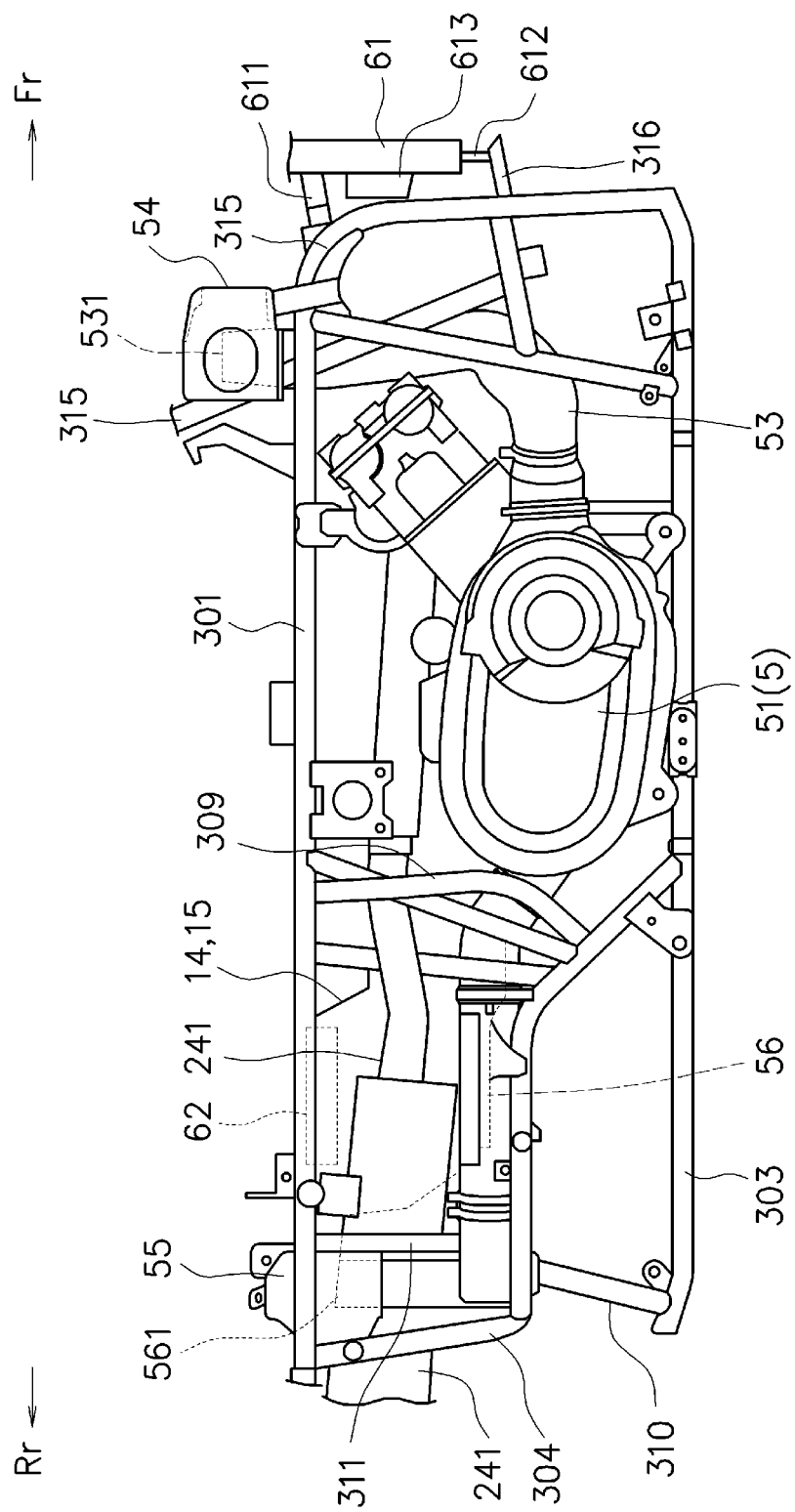
FIG. 11 is a right side view schematically illustrating an example of an arranged structure of the canister.
Figure 12:
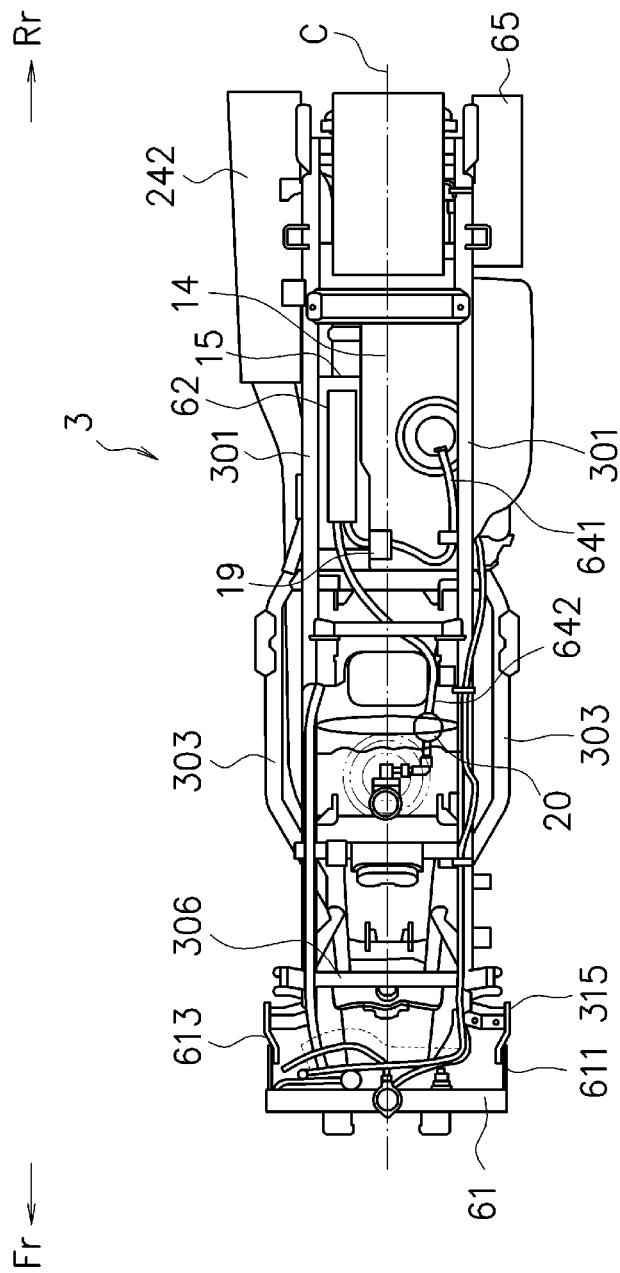
FIG. 12 is a top view schematically illustrating an example of the arranged structure of the canister.
Figure 13:
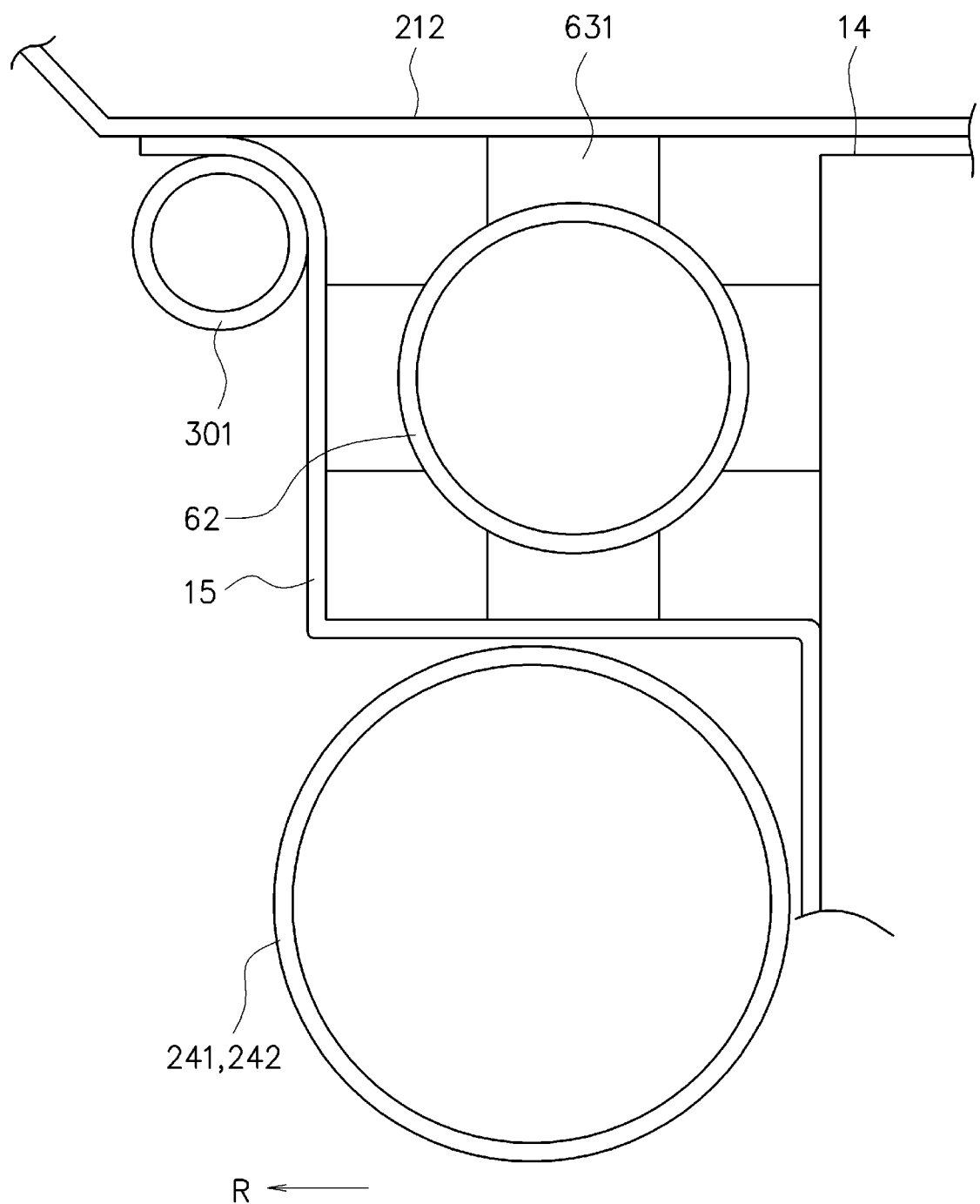
FIG. 13 is a cross-sectional view of the canister and its proximity cut off along a surface perpendicular to a front-rear direction.

The following describes the fourth embodiment of the present invention with reference to FIG. 11 to FIG. 13. The fourth embodiment has a form where the canister 62 is mounted to the lateral side of the fuel tank 14. FIGS. 11 to 13 are diagrams schematically illustrating an example of the arranged structure of the canister 62. FIG. 11 is a right side view, FIG. 12 is a top view, and FIG. 13 is a cross-sectional view cut off the canister 62 along a surface perpendicular to the front-rear direction. Like reference numerals designate corresponding or identical elements throughout the first embodiment and the fourth embodiment, and therefore such elements will not be further elaborated here.

This embodiment applies the tubular configuration to the canister 62. The configuration of the canister 62 may be identical to the first embodiment. As illustrated in FIG. 11, in side view, the canister 62 at least partially superimposes the fuel tank 14. As illustrated in FIG. 12, in top view, the canister 62 is disposed adjacent to the right side of the fuel tank 14. Especially, in top view, the canister 62 is positioned between the fuel tank 14 and the upper pipe 301 on the right.

As illustrated in FIG. 13, the saddle-ride type vehicle 1 includes the tank cover 15 and the rear fender 212. The tank cover 15 is the exterior for the fuel tank 14 and covers the outer periphery of the fuel tank 14. The rear fender 212 is one of the exterior members for the saddle-ride type vehicle 1. The rear fender 212 integrally covers the right and left pair of rear wheels 12 and the upper side at the rear portion of the body frame 3. The canister 62 is disposed to the right of the fuel tank 14 and in a space surrounded by the tank cover 15 and the rear fender 212. As described above, the fuel tank 14 is biased to the left in the vehicle width direction, and in top view, a clearance is formed between a right side surface of the fuel tank 14 and the upper pipe 301 on the right. The canister 62 is disposed on the lateral side of the fuel tank 14 and between the right side surface of the fuel tank 14 and the upper pipe 301 on the right. In this embodiment, since the canister 62 is disposed in this clearance, the canister 62 is disposed in a direction whose longitudinal direction is parallel to the front-rear direction. In this case, the canister 62 is disposed such that the end portion of the canister 62 on the side where the tank port 621 and the purge port 622 are disposed is positioned on the front side while the end portion of the canister 62 on the side where the pressure regulating port 623 is disposed is positioned on the rear side. The position of the front end of the canister 62 is positioned rearward with respect to the front surface of the fuel tank 14. The position of the rear end is positioned forward with respect to the rear surface of the fuel tank 14. That is, the canister 62 is disposed at the position superimposing the fuel tank 14 in the front-rear direction. As illustrated in FIG. 11, in side view, the canister 62 is disposed at the position where the canister 62 partially superimposes the upper pipe 301.

The one end of the pressure regulating pipe 643 is coupled to the pressure regulating port 623 of the canister 62. Similar to the first embodiment, the other end (the open side end) of the pressure regulating pipe 643 is disposed at any one of the inside of the air cleaner 16, near the intake port 531 of the intake duct 53, and near the exhaust port 561 of the exhaust duct 56. As long as the other end of the pressure regulating pipe 643 is disposed inside the air cleaner 16 or near the intake port 531 of the intake duct 53 (inside the intake port guard 54), the pressure regulating pipe 643 is piped along the upper pipe 301 on the right. On the other hand, as long as the other end of the pressure regulating pipe 643 is disposed near the exhaust port 561 of the exhaust duct 56, compared with other configurations, the pressure regulating port 623 of the canister 62 approaches the exhaust port 561 of the exhaust duct 56. In view of this, the pressure regulating pipe 643 may be directly (without along the body frame 3) extracted from the pressure regulating port 623 to the proximity of the exhaust port 561 of the exhaust duct 56.

The fourth embodiment of the present invention can provide the effects similar to the first embodiment. Furthermore, since this embodiment disposes the canister 62 on the upper side of the muffler 242, the canister 62 is heated by heat from exhaust air. Accordingly, in the case where the throttle body 18 suctions the exhaust air, separation capability of the absorbed fuel can be held.

(5) Fifth Embodiment

Figure 14:
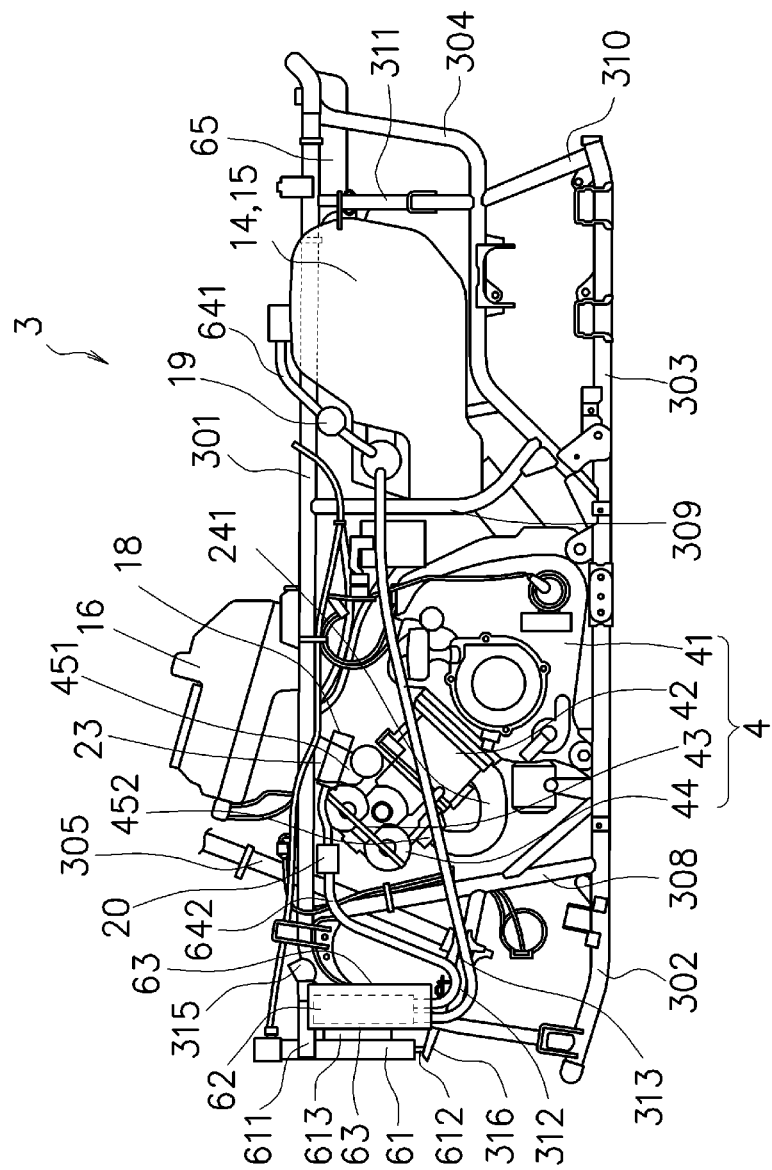
FIG. 14 is a left side view schematically illustrating mounting structures of a radiator and the canister.
Figure 15:
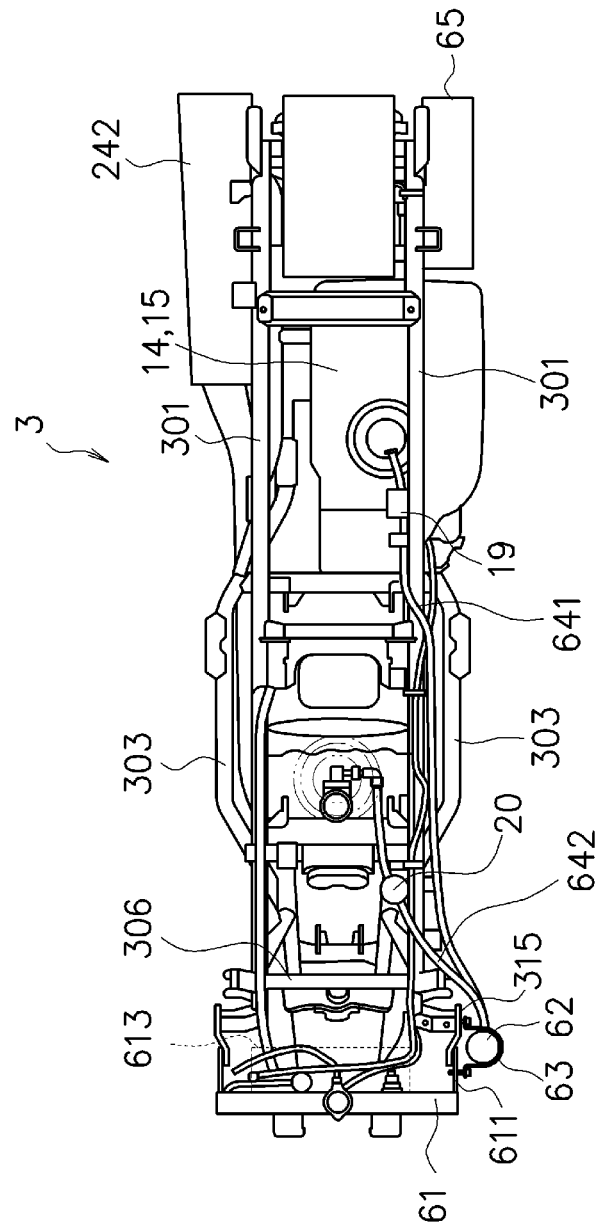
FIG. 15 is a top view schematically illustrating the mounting structures of the radiator and the canister.
Figure 16:
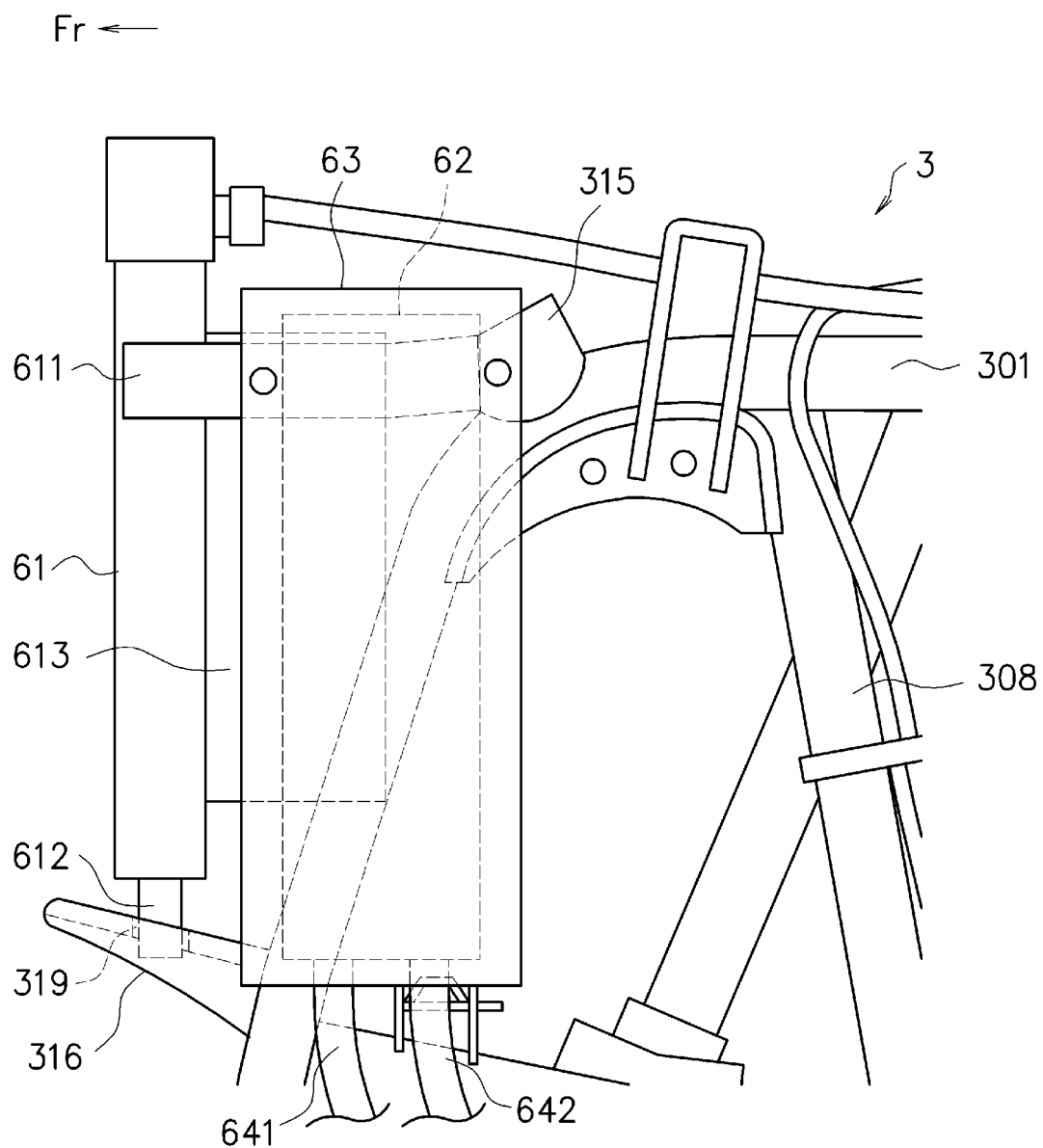
FIG. 16 is an enlarged view of a left side surface schematically illustrating the mounting structures of the radiator and the canister.
Figure 17:
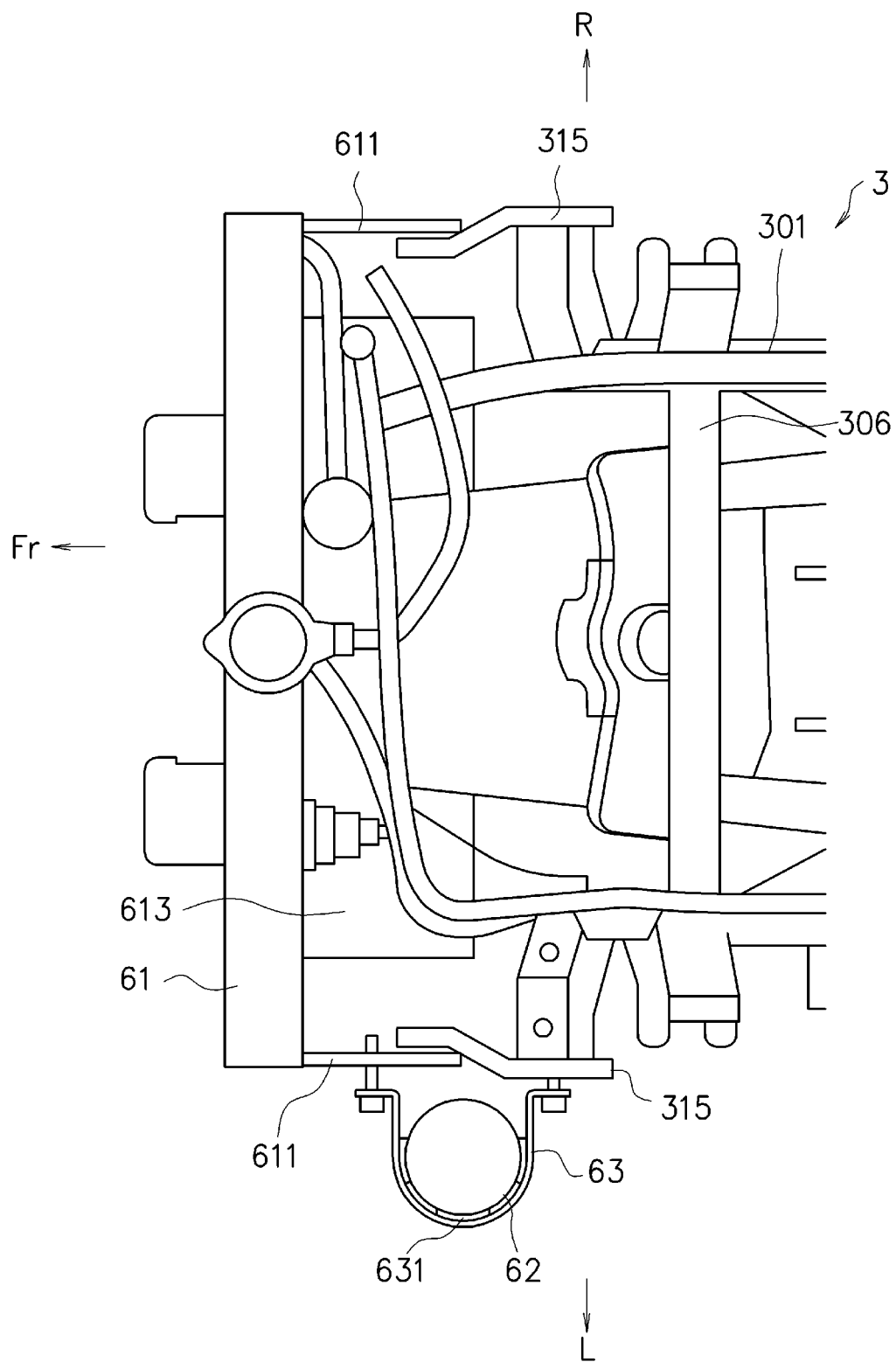
FIG. 17 is an enlarged top surface view schematically illustrating the mounting structures of the radiator and the canister.

The following describes the fifth embodiment of the present invention with reference to FIG. 14 to FIG. 17. The fifth embodiment has a form where the canister 62 is mounted near the radiator 61. FIG. 14 to FIG. 17 schematically illustrate the mounting structure of the radiator 61 and the canister 62. FIG. 14 is a left side view, FIG. 15 is a top view, FIG. 16 is an enlarged view of a left side surface, and FIG. 17 is an enlarged top surface view. Like reference numerals designate corresponding or identical elements throughout the first embodiment and the fifth embodiment, and therefore such elements will not be further elaborated here.

Compared with a vehicle assumed to travel paved roads (for example, an on-road type motorcycle), the all terrain vehicle like the saddle-ride type vehicle 1 according to the embodiment often contacts the foreign matter and is covered with water, dirt, or a similar foreign matter. Therefore, this embodiment with the configuration of disposing the radiator 61 at a foremost portion (or close to the foremost portion) of the saddle-ride type vehicle 1 prevents or restrains the contact of the foreign matter to the radiator fan 613 to avoid a deterioration in cooling effect by cooling water.

This embodiment applies the tubular-shaped canister 62. The configuration similar to the canister 62 described in the first embodiment is applicable to this canister 62. The canister holder 63 has the function that covers the outer peripheral surface of the canister 62 to protect the canister 62 and the function that holds the canister 62 to the body frame 3. The configuration similar to the canister holder 63 described in the first embodiment is applicable to this canister holder 63.

As illustrated in FIG. 14 to FIG. 17, the radiator fan 613 is disposed at the rear of the radiator 61. The canister 62 is disposed at the lateral side of the radiator fan 613. That is, in side view, at least a part of the canister 62 superimposes at least a part of the radiator fan 613. FIG. 14 to FIG. 17 illustrate the configuration where the canister 62 is disposed on the right of the radiator fan 613; however, the canister 62 may be disposed on the left side. The canister 62 is disposed in a direction whose longitudinal direction becomes approximately parallel to the up-down direction. In this case, the canister 62 is disposed in a direction where an end portion on the side where the pressure regulating port 623 is disposed is positioned on the upper side and an end portion on the side where the tank port 621 and the purge port 622 are disposed is positioned on the lower side.

In this embodiment, the canister 62 is mounted to the body frame 3 via the canister holder 63. The configuration identical to the first embodiment is applicable to this canister holder 63. The holder bracket 632 disposed close to the upper end of the canister holder 63 is secured to the upper radiator bracket 315 disposed at any one of the right and left pair of upper pipes 301 of the body frame 3 with bolts or similar members. Furthermore, the body frame 3 may include another bracket to fasten the holder bracket 632 disposed close to the lower end of the canister holder 63 with the bolt. This configuration secures at least the upper portion of the canister holder 63 to the body frame 3 with bolt. With the configuration of forming the canister holder 63 into approximately "U" shape in cross section or approximately "Ω" shape in cross section, the canister holder 63 covers the canister 62 outside in the vehicle width direction.

A bracket for the main body of the canister 62 may be disposed, and the canister 62 may have a configuration of being directly mounted to the upper radiator bracket 315 without via the canister holder 63.

The purge pipe 642 is piped along any one of the right and left pair of upper pipes 301 (in the examples illustrated in FIG. 14 to FIG. 17, the upper pipe 301 on the left) and is guided to the throttle body 18 (or the canister purge valve 20), which is disposed at the rear of the engine unit 4. The gas discharge pipe 641 is also piped along any one of the right and left pair of upper pipes 301 and is guided to the fuel tank 14. As long as the open side end of the pressure regulating pipe 643 is disposed inside the air cleaner 16, the pressure regulating pipe 643 is piped along the upper pipe 301 on the right and is guided to the inside of the air cleaner 16. As long as the open side end of the pressure regulating pipe 643 is disposed near the intake port 531 of the intake duct 53 (inside the intake port guard 54), the pressure regulating pipe 643 is piped from the canister 62 along the upper pipe 301 on the left, the upper cross member 306, and the upper pipe 301 on the right, and is guided to near the intake port 531 of the intake duct 53. As long as the open side end of the pressure regulating pipe 643 is disposed near the exhaust port 561 of the exhaust duct 56 (inside the exhaust port guide 55), the pressure regulating pipe 643 is piped from the canister 62 along the upper pipe 301 on the left, the upper cross member 306, and the upper pipe 301 on the right, and is guided to near the exhaust port 561 of the exhaust duct 56.

The fifth embodiment of the present invention disposes the canister 62 at the lateral side of the radiator fan 613. This restrains the contact of the foreign matter with the radiator fan 613 by the canister 62 (or the canister holder 63). In this manner, in this embodiment, the canister 62 or the canister holder 63 functions as a protective member to protect the radiator fan 613. This ensures securing operations of the radiator fan 613.

(6) Sixth Embodiment

Figure 18:
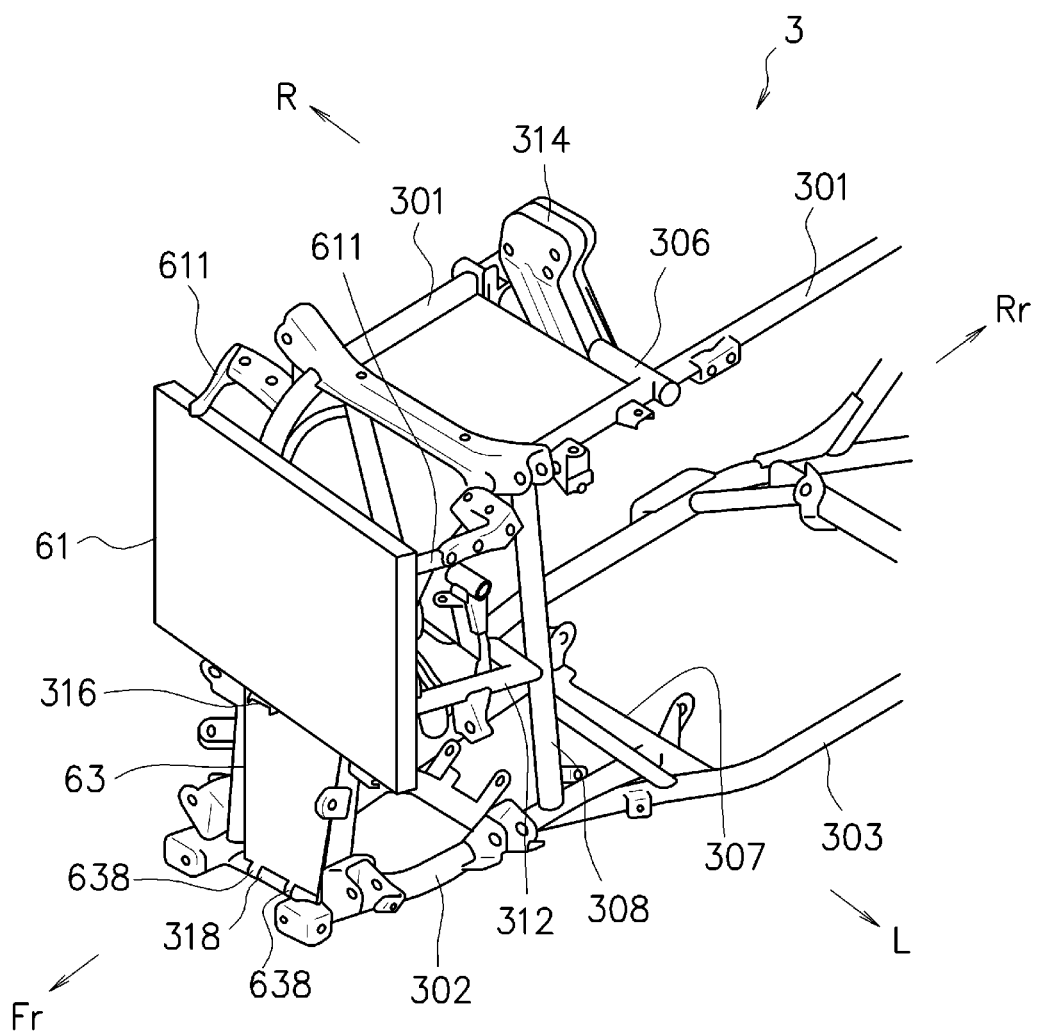
FIG. 18 is a perspective view schematically illustrating the mounting structure of the canister.
Figure 19A:
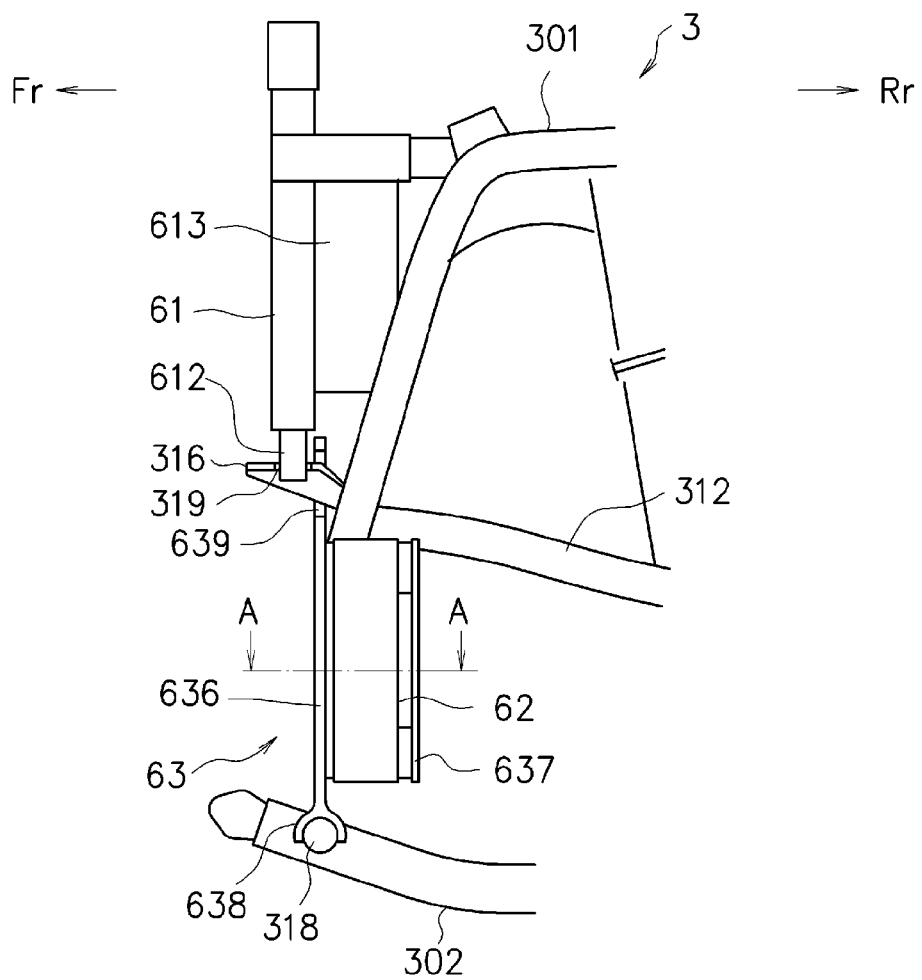
FIG. 19A is a cross-sectional view schematically illustrating the mounting structure of the canister.
Figure 19B:
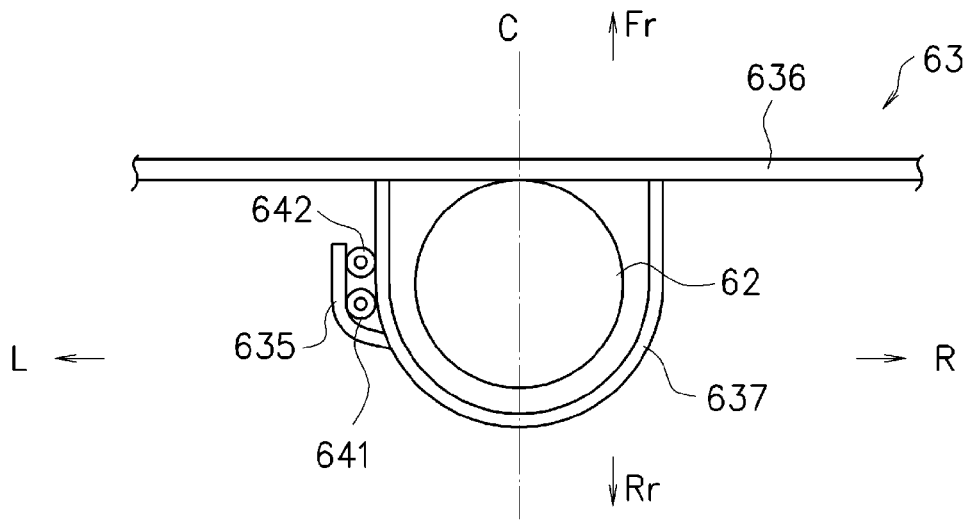
FIG. 19B is a cross-sectional view schematically illustrating the mounting structure of the canister.

The following describes the sixth embodiment of the present invention with reference to FIG. 18, FIG. 19A, and FIG. 19B. The sixth embodiment is a form where the canister 62 is mounted near the radiator 61. FIG. 18, FIG. 19A, and FIG. 19B schematically illustrate the mounting structure of the canister 62. FIG. 18 is a perspective view, FIG. 19A is a cross-sectional view cut off along a surface parallel to the front-rear direction and the up-down direction, and FIG. 19B is a cross-sectional view cut off along a surface in the approximately horizontal direction.

As described above, compared with the vehicle assumed to travel the paved roads, the all terrain vehicle like the saddle-ride type vehicle 1 according to the embodiment often contacts the foreign matter and is covered with water, dirt, or a similar foreign matter. Therefore, the foreign matter intrudes from the front of the vehicle body and may remain near the engine unit 4. This embodiment prevents or restrains the intrusion of the foreign matter near the engine unit 4.

FIG. 18, FIG. 19A, and FIG. 19B illustrate the application of the tubular canister 62; however, the box-shaped canister 62 may be applicable. The configuration identical to the first embodiment and the second embodiment is applicable to this canister 62.

The canister holder 63 has a function that covers the outer peripheral surface of the canister 62 to protect the canister 62 and a function that holds the canister 62 to the body frame 3. As illustrated in FIG. 19A and FIG. 19B, the canister holder 63 includes a main body 636 and a holding portion 637. The holding portion 637 is disposed integrally with the main body 636. The main body 636 is a plate-shaped part mounted to the body frame 3 and is formed into, for example, approximately quadrangle in front view. An engagement hole 639 to mount the main body 636 to the body frame 3 is formed near an upper end (an upper side) of the main body 636. The engagement hole 639 is a through-hole (an opening) passing through in the front-rear direction (a thickness direction of the main body 636). An engagement piece 638 to engage with the body frame 3 is disposed at a lower end (a lower side) of the main body 636. The engagement piece 638 is formed into an approximately inverted "U" shape that opens on the lower side in side view. The holding portion 637 is a part to hold the canister 62 and has a tubular structure whose cross section is approximately "U" shape and extending in the up-down direction. The holding portion 637 is disposed at an approximately center in the vehicle width direction at the rear side of the main body 636. On the inner peripheral side of the holding portion 637, the supporting member 631 to hold the canister 62 is disposed. An elastic body such as rubber and sponge is applicable to this supporting member 631. The canister 62 can be housed to the inner peripheral side of the holding portion 637, and the supporting member 631 holds the housed canister 62.

An attachment structure of the canister 62 to the body frame 3 is as follows. With the holding portion 637 holding the canister 62, the engagement piece 638 of the main body 636 is engaged with a front lower bridge 318 of the body frame 3 from the front upper side. The front lower bridge 318 is a part to couple the right and left pair of front lower pipes 302 to one another at near the respective front end portions and extends horizontally in the vehicle width direction. With the engagement piece 638 engaged with the front lower bridge 318, leaning the main body 636 rearward with the front lower bridge 318 as a fulcrum inserts the lower radiator bracket 316 of the body frame 3 through the engagement hole 639 on the main body 636. This projects the lower radiator bracket 316 to the front side of the main body 636 of the canister holder 63. The radiator 61 is mounted to the body frame 3 in this state. Since the engagement piece 638 on the main body 636 of the canister holder 63 engages with the front lower bridge 318 of the body frame 3 from upward, the movement of the main body 636 in the front-rear direction is restricted. Additionally, since the lower radiator bracket 316 is inserted through the engagement hole 639 on the main body 636, the movement of the main body 636 in the up-down direction and the right-left direction is restricted. Mounting the radiator 61 restricts the forward movement of the main body 636 by the radiator 61. In this manner, this embodiment can mount the canister 62 to the body frame 3 via the canister holder 63 without the use of a fixture such as bolts.

The holding portion 637 of the canister holder 63 is disposed at the approximately center in the vehicle width direction of the main body 636, and the canister holder 63 is mounted to the approximately center of the body frame 3 in the vehicle width direction. In view of this, the canister 62 is disposed approximately center in the vehicle width direction in front view. The lower radiator bracket 316 is inserted through the engagement hole 639, which is disposed near the upper end (the upper side) of the canister holder 63. The mounting boss 612, which is disposed at the lower surface of the radiator 61, engages with the through-hole 319 formed at the lower radiator bracket 316. Accordingly, in front view, the canister 62 is disposed below the radiator 61. In this manner, in front view, this embodiment disposes the canister 62 at approximately center in the vehicle width direction on the lower side of the radiator 61. In side view, the canister 62 is disposed at the rear of the main body 636 of the canister holder 63. Furthermore, the holding portion 637 of the canister holder 63 extends in the up-down direction and the canister 62 can be inserted in a direction whose longitudinal direction is approximately parallel to the up-down direction. Accordingly, the canister 62 is held to the body frame 3 in the direction whose longitudinal direction is approximately parallel to the up-down direction. For example, the canister 62 is disposed in a direction where the end portion on the side where the pressure regulating port 623 is disposed is positioned on the upper side and the end portion on the side where the tank port 621 and the purge port 622 are disposed is positioned on the lower side.

The purge pipe 642 is piped from the canister 62 along any one of the right and left pair of upper pipes 301 and is guided to the throttle body 18 (or the canister purge valve 20), which is disposed at the rear of the engine unit 4. The gas discharge pipe 641 is also piped along any one of the right and left pair of upper pipes 301 and is guided to the fuel tank 14. The pressure regulating pipe 643 is also piped along any one of the right and left pair of upper pipes 301 and is guided to any one of the inside of the air cleaner 16, the inside of the intake port guard 54, and the inside of the exhaust port guide 55. As illustrated in FIG. 19B, the following configuration may be applied. A lock hook 635 to lock the purge pipe 642 and the gas discharge pipe 641 is disposed at an outer peripheral surface of the holding portion 637. This lock hook 635 holds the purge pipe 642 and the gas discharge pipe 641 to the outer peripheral surface of the holding portion 637. The canister may be disposed such that the longitudinal direction becomes horizontal or to be inclined.

The sixth embodiment of the present invention prevents or restrains the intrusion of the foreign matter from the front side by the canister holder 63. Accordingly, this ensures preventing or restraining the intrusion and a stay of the foreign matter near the engine unit 4.

(7) Seventh Embodiment

Figure 20:
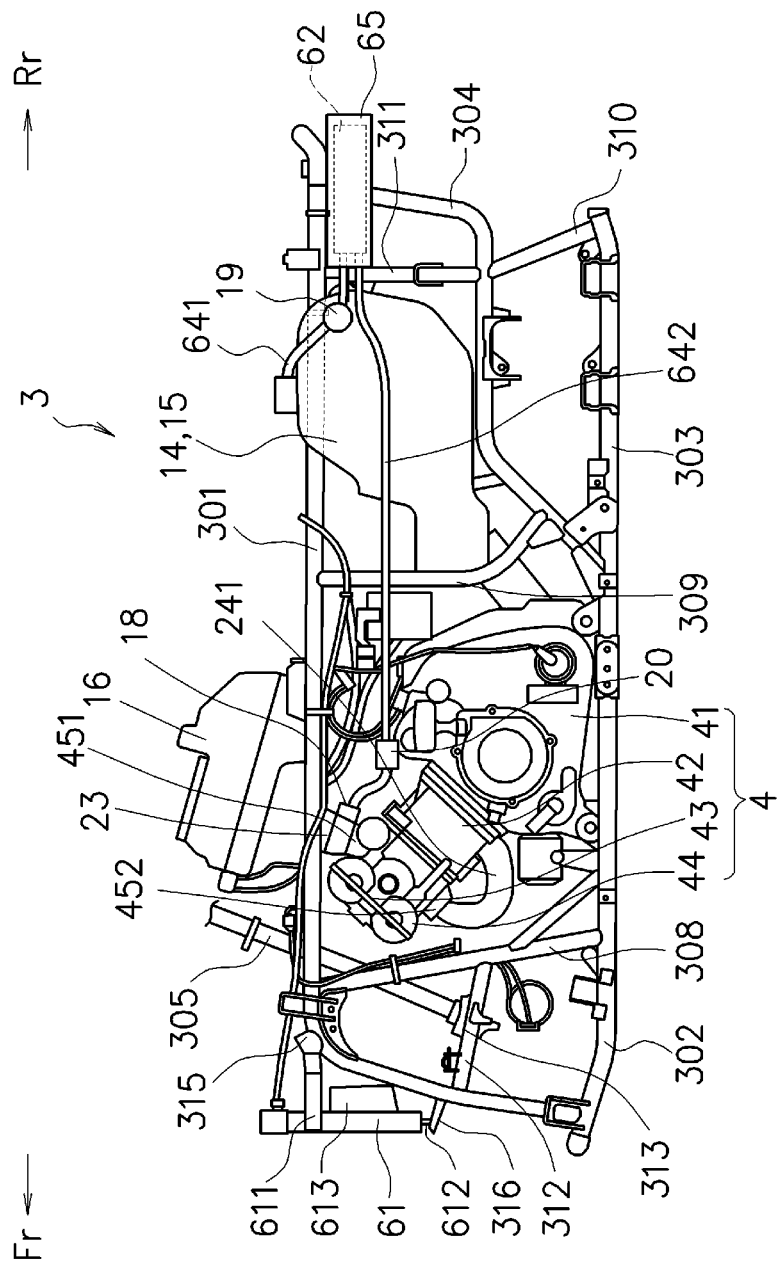
FIG. 20 is a left side view schematically illustrating a mounting structure of the canister of the saddle-ride type vehicle according to a seventh embodiment.
Figure 21:
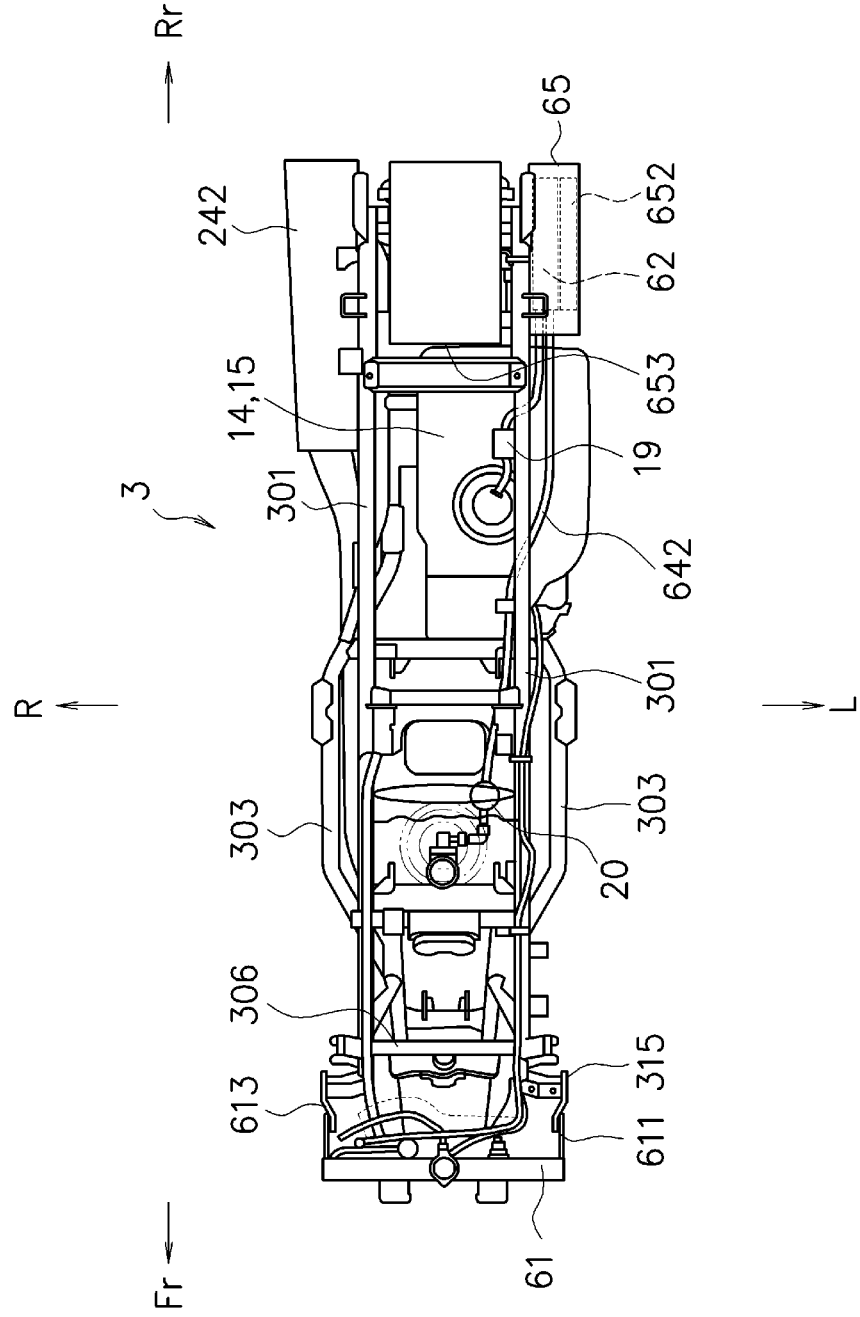
FIG. 21 is a top view schematically illustrating the mounting structure of the canister of the saddle-ride type vehicle according to the seventh embodiment.
Figure 22A:
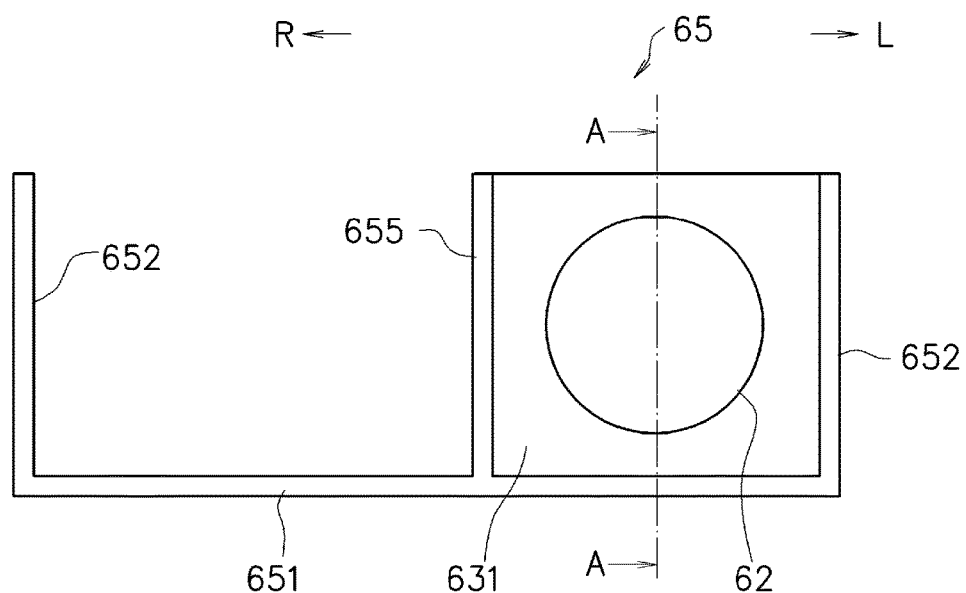
FIG. 22A is a cross-sectional view of an article housing.
Figure 22B:
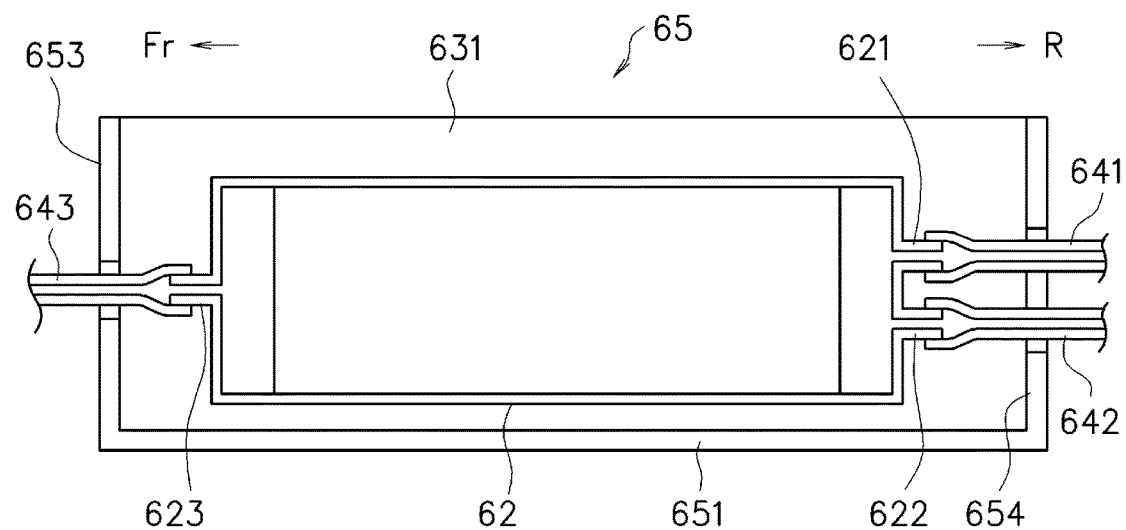
FIG. 22B is a cross-sectional view of the article housing.

The following describes the seventh embodiment of the present invention. The seventh embodiment has a form where the canister 62 is mounted inside an article housing 65. Like reference numerals designate corresponding or identical elements throughout the first embodiment and the seventh embodiment, and therefore such elements will not be further elaborated here. FIG. 20 to FIG. 22B are diagrams schematically illustrating the mounting structure of the canister 62 of the saddle-ride type vehicle 1 according to the seventh embodiment. FIG. 20 is a left side view and FIG. 21 is a top view. FIG. 22A and FIG. 22B are cross-sectional views of the article housing 65.

In addition of the canister 62 to a vehicle of existing type, to secure the arrangement space for the canister 62, there may be a case where the configuration of the body frame 3 and the layout of the devices need to be changed. Doing so requires the design change, increasing the production cost. Additionally, this fails to share the components with the vehicle of existing type. Therefore, this embodiment provides a configuration that can dispose the canister 62 without the changes in the configuration of the body frame 3 and the layout of the devices.

In side view, the article housing 65 is disposed at the rear of the fuel tank 14 and outside of the vehicle body at the right and left pair of upper pipes 301 in top view. The article housing 65 has a box shape. The article housing 65 is, for example, made of a resin material and is formed by injection molding. This embodiment includes the canister 62 at the inside of this article housing 65.

As illustrated in FIG. 22A and FIG. 22B, the article housing 65 has a bottom portion 651 and sidewall portions 652 stood from both right and left sides of this bottom portion 651. Furthermore, the article housing 65 has a partition wall portion 655, which is stood in the approximately up-down direction and extends in the front-rear direction, with a predetermined distance from the right and left sidewall portions 652. The canister 62 is housed in a space formed between this partition wall portion 655 and one of the right and left sidewall portions 652. FIG. 22A illustrates the configuration where the canister 62 is housed between the partition wall portion 655 and the sidewall portion 652 on the left. Note that, the canister 62 may be housed between the partition wall portion 655 and the sidewall portion 652 on the right. As illustrated in FIG. 22A and FIG. 22B, the canister 62 is housed in the article housing 65 with the peripheral area covered with the supporting member 631. The supporting member 631 is, for example, formed of an elastically deformable member such as rubber and sponge. An external dimension and a shape of the supporting member 631 are formed into the dimension and the shape with which the supporting member 631 can be housed in the space for housing the canister 62 (in FIG. 22A, the space formed by the sidewall portion 652 on the left and the partition wall portion 655). For example, the supporting member 631 is formed into the dimension and the shape approximately identical to this space. The supporting member 631 includes a through-hole passing through in the front-rear direction. This through-hole houses the canister 62. The canister 62 held by the supporting member 631 (the canister 62 inserted into the through-hole on the supporting member 631) is housed in the article housing 65. A lid member to cover this space may be additionally disposed. On a front wall portion 653 and a rear wall portion 654 of the article housing 65, opening or cutouts to extract the respective gas discharge pipe 641, purge pipe 642, and pressure regulating pipe 643, which are coupled to the canister 62, are formed.

The purge pipe 642 is extracted from the inside of the article housing 65, piped along any one of the right and left pair of upper pipes 301 and guided to the throttle body 18 (or the canister purge valve 20) disposed at the rear of the engine unit 4. The gas discharge pipe 641 is extracted from the article housing 65, piped along any one of the right and left pair of upper pipes 301, and guided to the fuel tank 14. The pressure regulating pipe 643 is extracted from the article housing 65, piped along any one of the right and left pair of upper pipes 301, and guided to any one of the inside of the air cleaner 16, near the intake port 531 of the intake duct 53 (inside the intake port guard 54), and near the exhaust port 561 of the exhaust duct 56 (inside the exhaust port guide 55).

The space between the partition wall portion 655 and the other sidewall portion 652 (in FIG. 22A, the sidewall portion 652 on the right) can be used as the space that can house industrial tools for maintenance or a similar tool as heretofore. Instead of the article housing 65, the canister 62 may be disposed. That is, the space that can house articles may not be disposed.

Since the seventh embodiment of the present invention disposes the canister 62 inside the article housing 65, the configuration of the body frame 3 and the layout of the devices may not be changed. This eliminates a need for design change of these members, thereby ensuring sharing the members other than the article housing 65. This allows restraining the increase in production cost. Since this embodiment disposes the canister 62 adjacent to the fuel tank 14, this embodiment can provide the effects similar to the first embodiment.

(8) Eighth Embodiment

Figure 23:
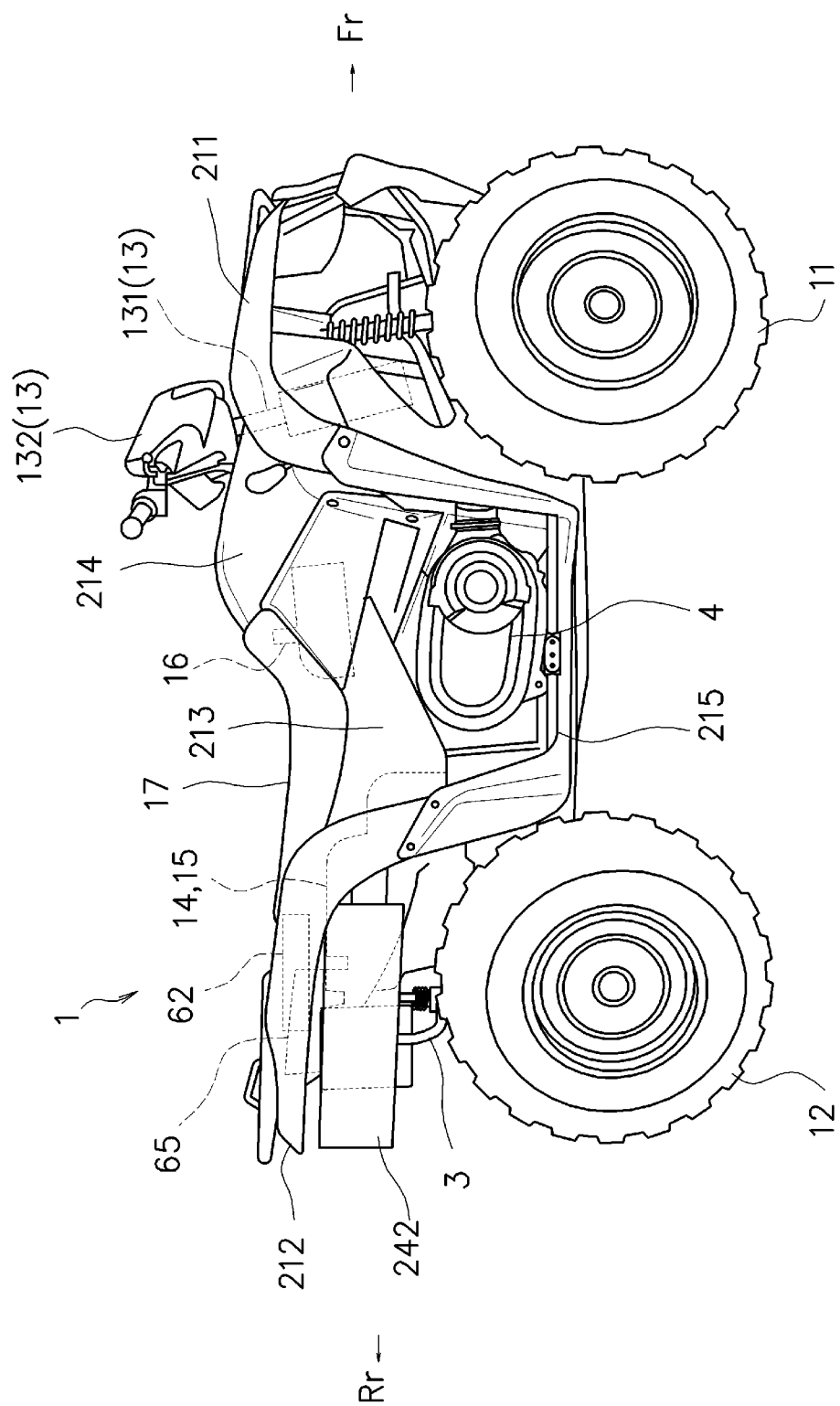
FIG. 23 is a right side view schematically illustrating the mounting structure of the canister.

The following describes the eighth embodiment of the present invention with reference to FIG. 23 and FIG. 24. The eighth embodiment has a form where the canister 62 is mounted to an exterior member for the saddle-ride type vehicle 1. FIG. 23 and FIG. 24 are diagrams schematically illustrating the mounting structure of the canister 62. FIG. 23 is the right side view and FIG. 24 is the cross-sectional view.

Compared with the vehicle assumed to travel the paved roads, the all terrain vehicle like the saddle-ride type vehicle 1 according to the embodiment often contacts the foreign matter and is covered with water, dirt, or a similar foreign matter. This possibly contacts the foreign matter to the canister 62, resulting in damage. This embodiment provides a configuration to restrain the damage of the canister 62.

This embodiment includes a housing space 217 to dispose the canister 62 at the rear fender 212, one of the exterior members for the saddle-ride type vehicle 1. The canister 62 is disposed in this housing space 217 and is mounted to the rear fender 212. The specific configuration is as follows. As illustrated in FIG. 23, the rear fender 212 is disposed at the rear portion of the saddle-ride type vehicle 1 as one of the exterior members. The rear fender 212 is positioned at the rear of the seat 17 and upward and rearward of the fuel tank 14. The rear fender 212 is a testaceous member to integrally cover the upper sides of the right and left pair of rear wheels 12. The rear fender 212 is, for example, made of a resin material and is formed by injection molding.

The rear fender 212 includes the housing space 217 to house the canister 62. As illustrated in FIG. 24, a plate-shaped lining member 216 is disposed at a lower surface of the rear fender 212. The rear fender 212 and the lining member 216 form the housing space 217 to house the canister 62. That is, a space surrounded by the rear fender 212 and the lining member 216 becomes the housing space 217 to house the canister 62. This housing space 217 is disposed at a position near the fuel tank 14. For example, as illustrated in FIG. 23, a configuration that disposes the housing space 217 near the right side at the rear portion of the body frame 3 is applicable. In this case, as illustrated in FIG. 23, in side view, the canister 62 is disposed obliquely upward at the rear of the fuel tank 14.

With the eighth embodiment of the present invention, the rear fender 212, one of the exterior members, includes the housing space 217 to house the canister 62, and the canister 62 is housed in this housing space 217. This prevents the foreign matter from contacting the canister 62, thus preventing damage of the canister 62. Furthermore, this embodiment disposes the canister 62 at the position adjacent to the fuel tank 14. This ensures providing an effect similar to the first embodiment.

While the respective embodiments of the present invention are described above in detail with reference to the drawings, the respective embodiments merely describe the concrete examples to embody the present invention. The technical scope of the present invention is not limited to the respective embodiments. Various modifications are possible within the scope of the present invention and the modifications will be encompassed within the scope of the present invention. For example, although the respective embodiments of the present invention describe the all terrain vehicles as the saddle-ride type vehicle, the saddle-ride type vehicle to which the present invention is applicable is not limited to the all terrain vehicle. For example, the present invention is applicable to various saddle-ride type vehicles such as motorcycles, three-wheeled vehicles, and snowmobiles.

With the present invention, the canister can be mounted without the change in arrangements of the body frame and the devices.

What is claimed is:

1. A saddle-ride type vehicle comprising:
an internal combustion engine as a driving power source;
a fuel tank configured to store fuel for the internal combustion engine;
a canister configured to trap fuel vapor generated in the fuel tank;
a canister holder that holds the canister, wherein
the canister is disposed adjacent to the fuel tank,
the canister is mounted to the fuel tank via the canister holder,
the canister includes a pressure regulating port, the pressure regulating port communicating between an inside and an outside of the canister, and
a labyrinth structure is disposed between an outer peripheral surface of the canister and an inner peripheral surface of the canister holder.

2. A saddle-ride type vehicle comprising:
an internal combustion engine as a driving power source;
a fuel tank configured to store fuel for the internal combustion engine;

a canister configured to trap fuel vapor generated in the fuel tank;

a canister holder that holds the canister, wherein the canister includes a pressure regulating port, the pressure regulating port communicating between an inside and an outside of the canister, and a labyrinth structure is disposed between an outer peripheral surface of the canister and an inner peripheral surface of the canister holder.

3. The saddle-ride type vehicle according to claim 2, further comprising a radiator used for the internal combustion engine;

a body frame to which the radiator is mounted, wherein:

the radiator is mounted to a front portion of the body frame, and the canister is disposed at a lateral side of a radiator fan, the radiator fan being disposed at a rear of the radiator.

4. The saddle-ride type vehicle according to claim 2, further comprising a radiator used for the internal combustion engine;

a body frame to which the radiator is mounted, wherein:

the radiator is mounted to a front portion of the body frame, and in front view, the canister is disposed below the radiator.

5. A saddle-ride type vehicle comprising:

an internal combustion engine as a driving power source;

a fuel tank configured to store fuel for the internal combustion engine;

a canister configured to trap fuel vapor generated in the fuel tank;

a transmission;

an intake duct coupled to the transmission, the intake duct being configured to take in air to cool the transmission; and an exhaust duct coupled to the transmission, the exhaust duct being configured to discharge the air that has cooled the transmission, wherein:

the canister is disposed adjacent to the fuel tank, one end of a flow passage that communicates between an inside and an outside of the canister is coupled to the canister, and an other end of the flow passage is disposed near any one of an intake port disposed at the intake duct or an exhaust port disposed at the exhaust duct.

6. A saddle-ride type vehicle comprising:

an internal combustion engine as a driving power source;

a fuel tank configured to store fuel for the internal combustion engine;

a canister configured to trap fuel vapor generated in the fuel tank;

a transmission;

an intake duct coupled to the transmission, the intake duct being configured to take in air to cool the transmission; and an exhaust duct coupled to the transmission, the exhaust duct being configured to discharge the air that has cooled the transmission, wherein:

one end of a flow passage that communicates between an inside and an outside of the canister is coupled to the canister, and an other end of the flow passage is disposed near any one of an intake port disposed at the intake duct or an exhaust port disposed at the exhaust duct.

7. The saddle-ride type vehicle according to claim 6, further comprising a radiator used for the internal combustion engine;

a body frame to which the radiator is mounted, wherein:

the radiator is mounted to a front portion of the body frame, and the canister is disposed at a lateral side of a radiator fan, the radiator fan being disposed at a rear of the radiator.

8. The saddle-ride type vehicle according to claim 6, further comprising a radiator used for the internal combustion engine;

a body frame to which the radiator is mounted, wherein:

the radiator is mounted to a front portion of the body frame, and in front view, the canister is disposed below the radiator.

9. The saddle-ride type vehicle according to claim 6, further comprising a housing configured to house an article, wherein the canister is disposed inside the housing.

10. The saddle-ride type vehicle according to claim 6, further comprising an exterior member disposed outside the saddle-ride type vehicle, wherein the canister is disposed at the exterior member.

* * * * *